United States Patent
Tsai et al.

(10) Patent No.: US 8,724,239 B2
(45) Date of Patent: May 13, 2014

(54) OPTICAL LENS SYSTEM FOR IMAGE TAKING

(75) Inventors: Tsung-Han Tsai, Taichung (TW); Ming-Ta Chou, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 107 days.

(21) Appl. No.: 13/438,674

(22) Filed: Apr. 3, 2012

(65) Prior Publication Data
US 2013/0120859 A1    May 16, 2013

(30) Foreign Application Priority Data
Nov. 11, 2011    (TW) .............................. 100141270 A

(51) Int. Cl.
G02B 9/12    (2006.01)
G02B 13/18    (2006.01)
G02B 13/00    (2006.01)

(52) U.S. Cl.
CPC .............................. *G02B 13/0035* (2013.01)
USPC .......................................... 359/784; 359/716

(58) Field of Classification Search
USPC .......................................... 359/716, 753, 784
See application file for complete search history.

(56) References Cited

U.S. PATENT DOCUMENTS 7,397,612 B2    7/2008    Chen et al.
7,548,384 B1 *   6/2009    Liang et al. ................... 359/773

* cited by examiner

*Primary Examiner* — William Choi
(74) *Attorney, Agent, or Firm* — Morris Manning & Martin LLP; Tim Tingkang Xia, Esq.

(57) ABSTRACT

An optical lens system for image taking includes, in order from an object side to an image side, a first lens element with negative refractive power having a concave object-side surface and a concave image-side surface, a second lens element with positive refractive power having a convex image-side surface, and a third lens element with negative refractive power having a concave image-side surface of the third lens element near an optical axis and a convex image-side surface of the third lens element away from the optical axis. Both the object-side surface and the image-side surface of the third lens element are aspheric. The third lens element is made of plastic.

21 Claims, 16 Drawing Sheets

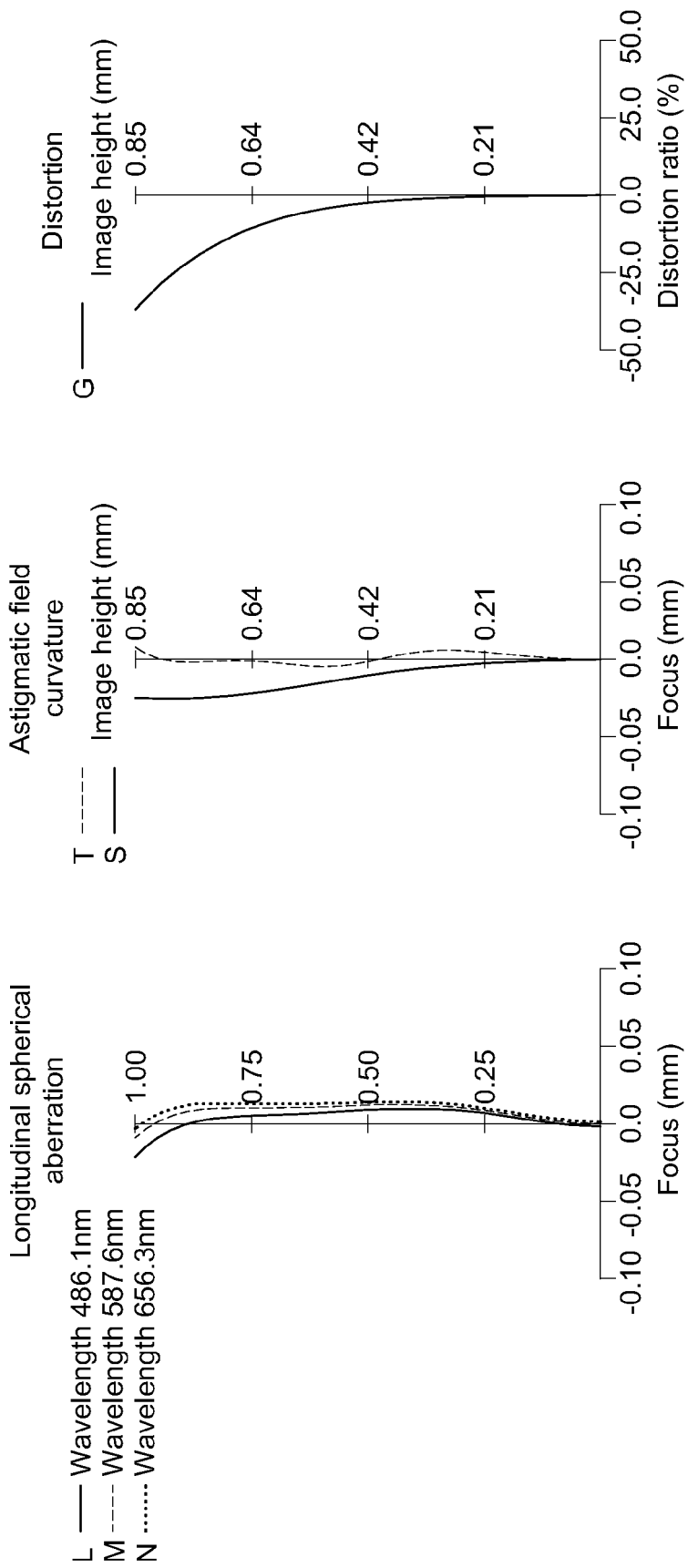

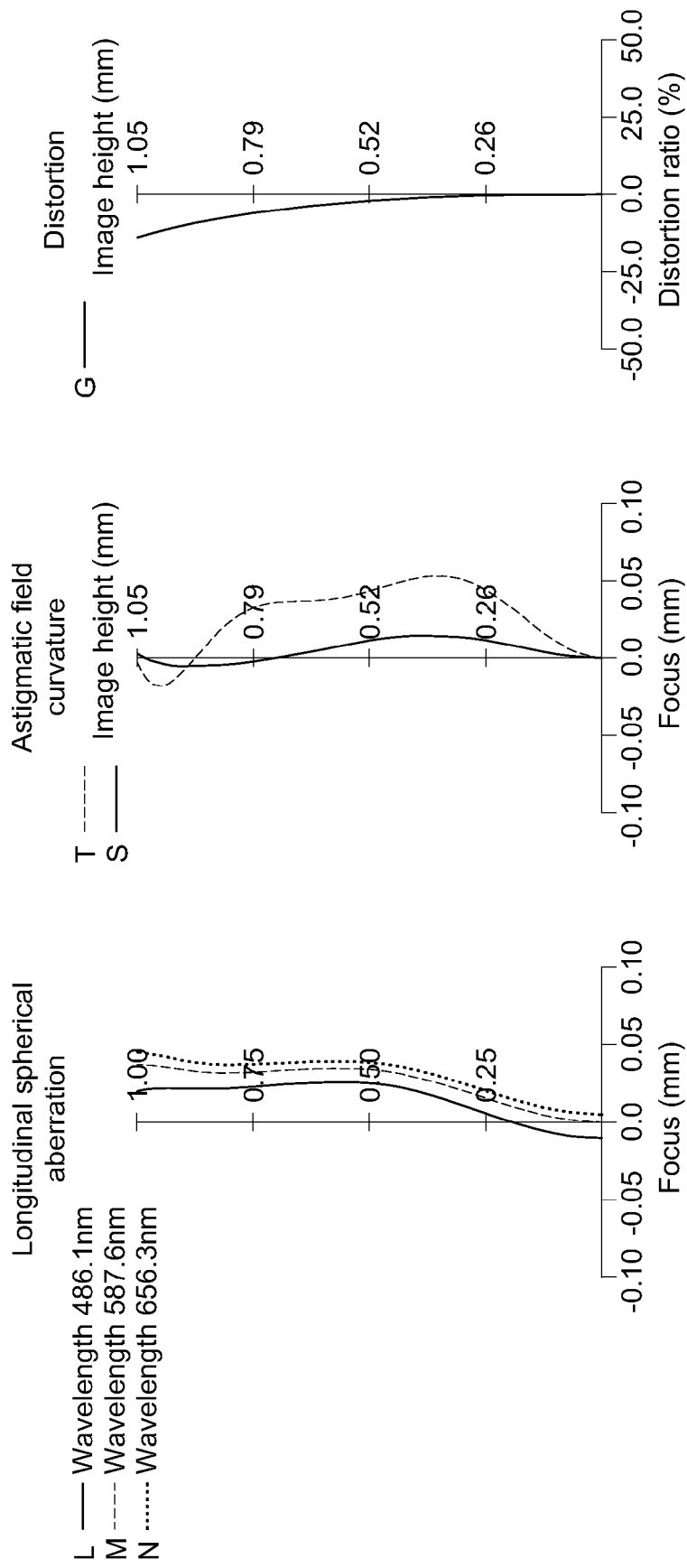

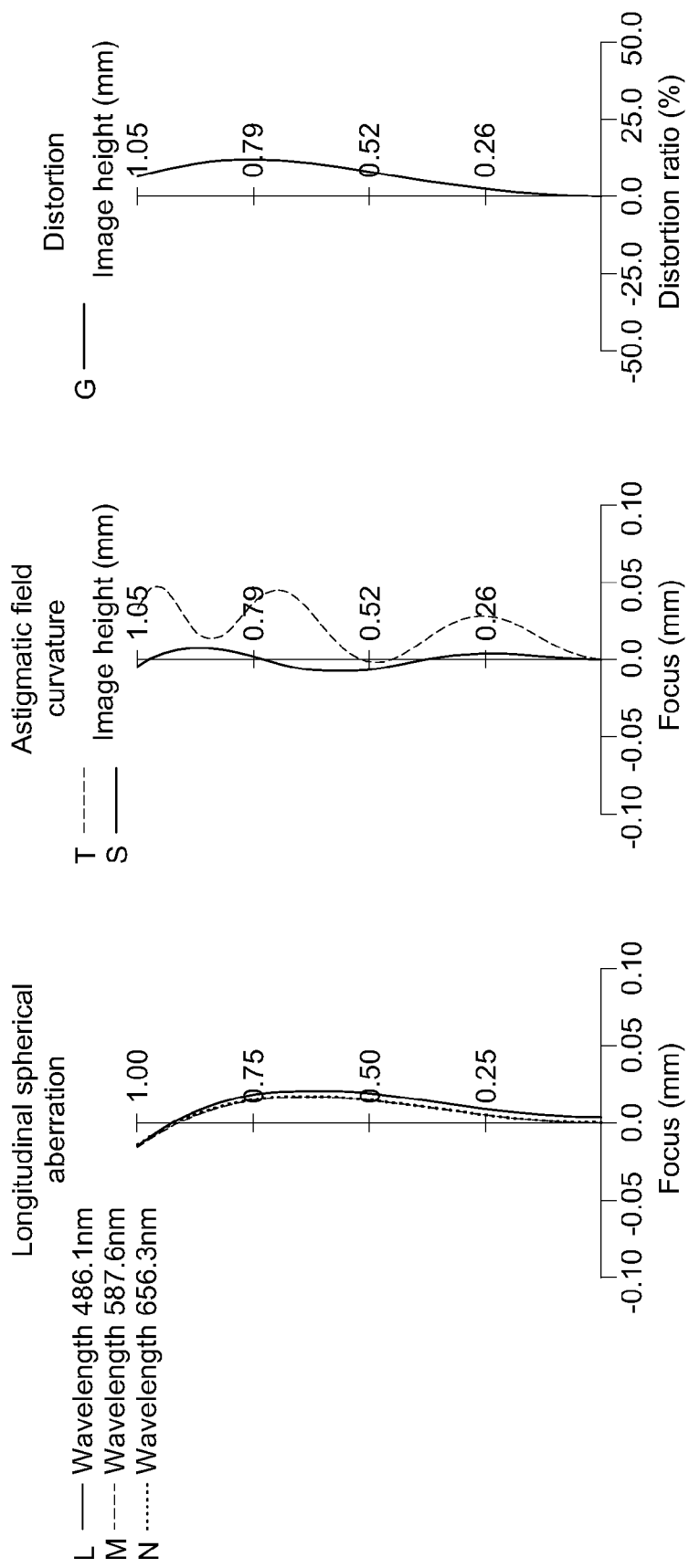

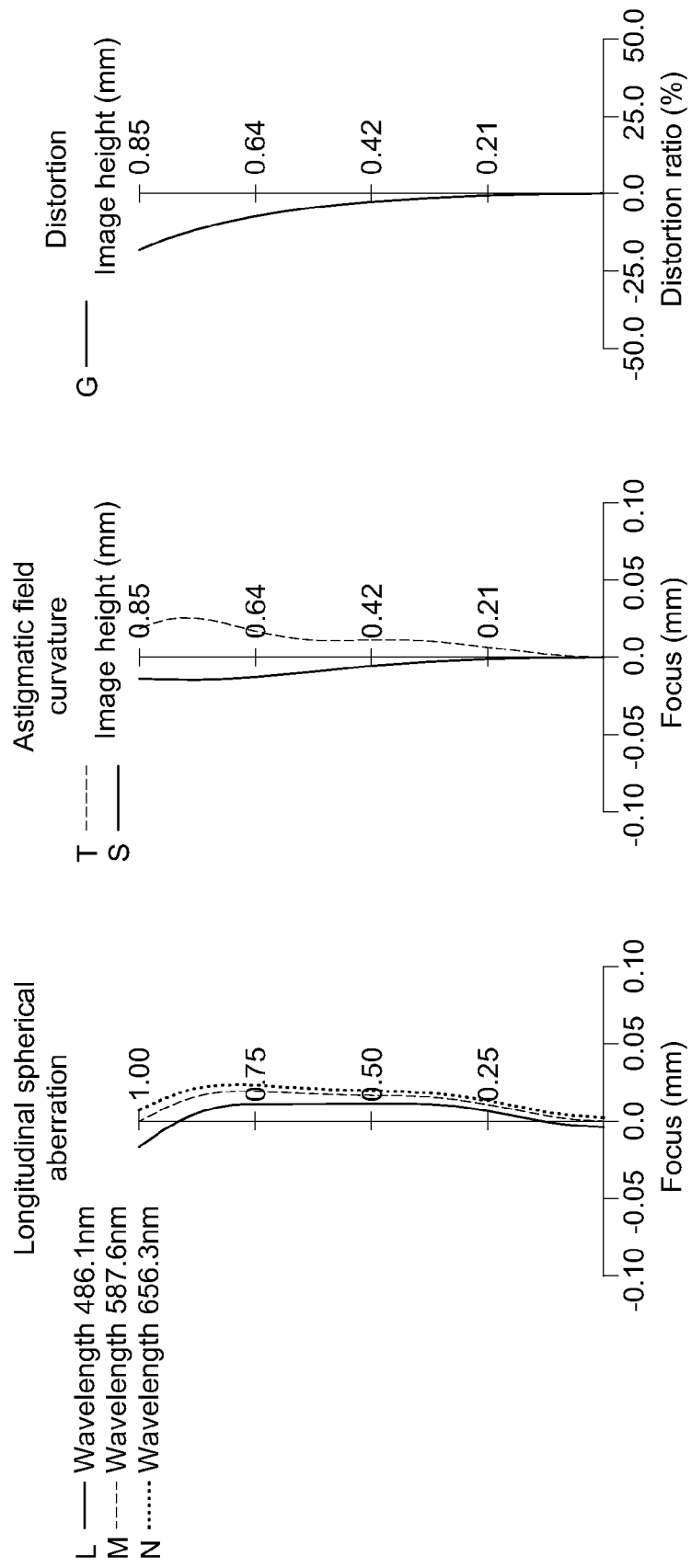

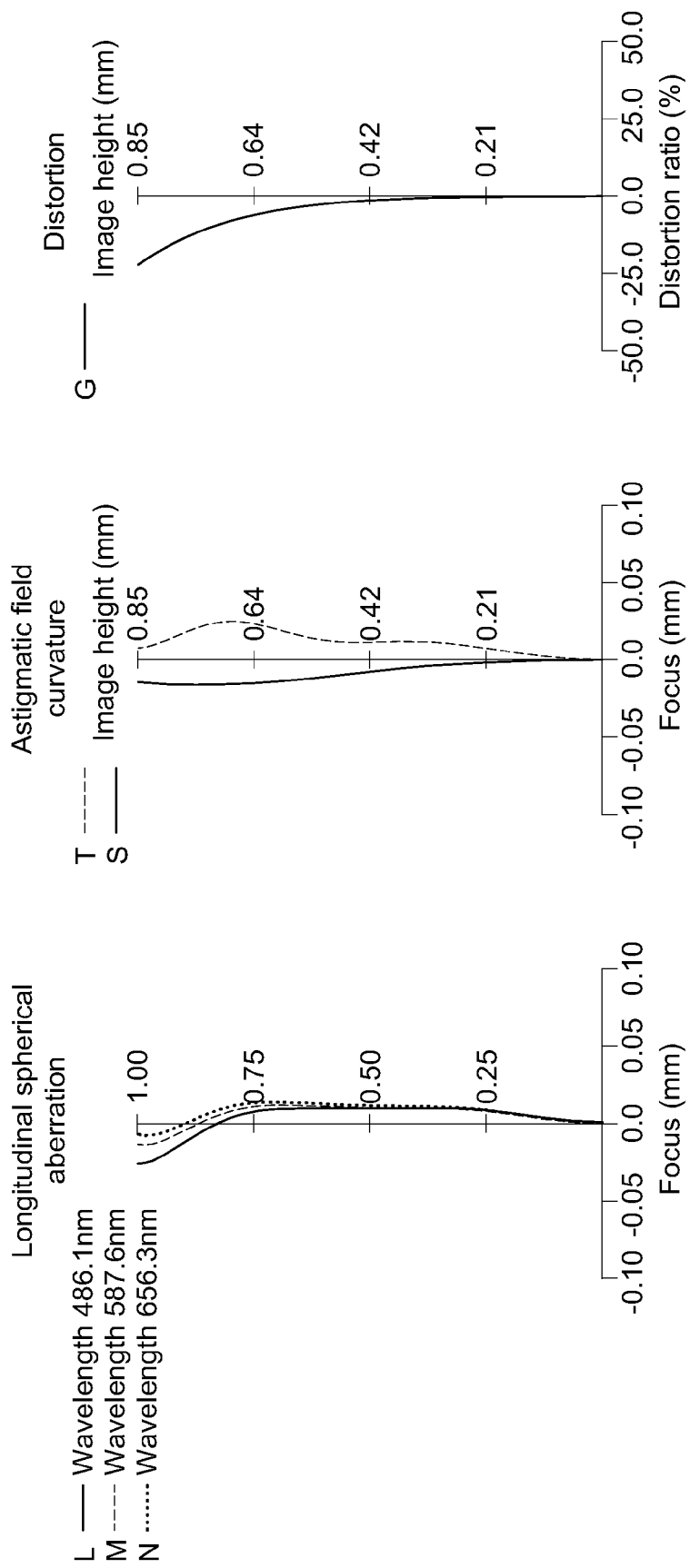

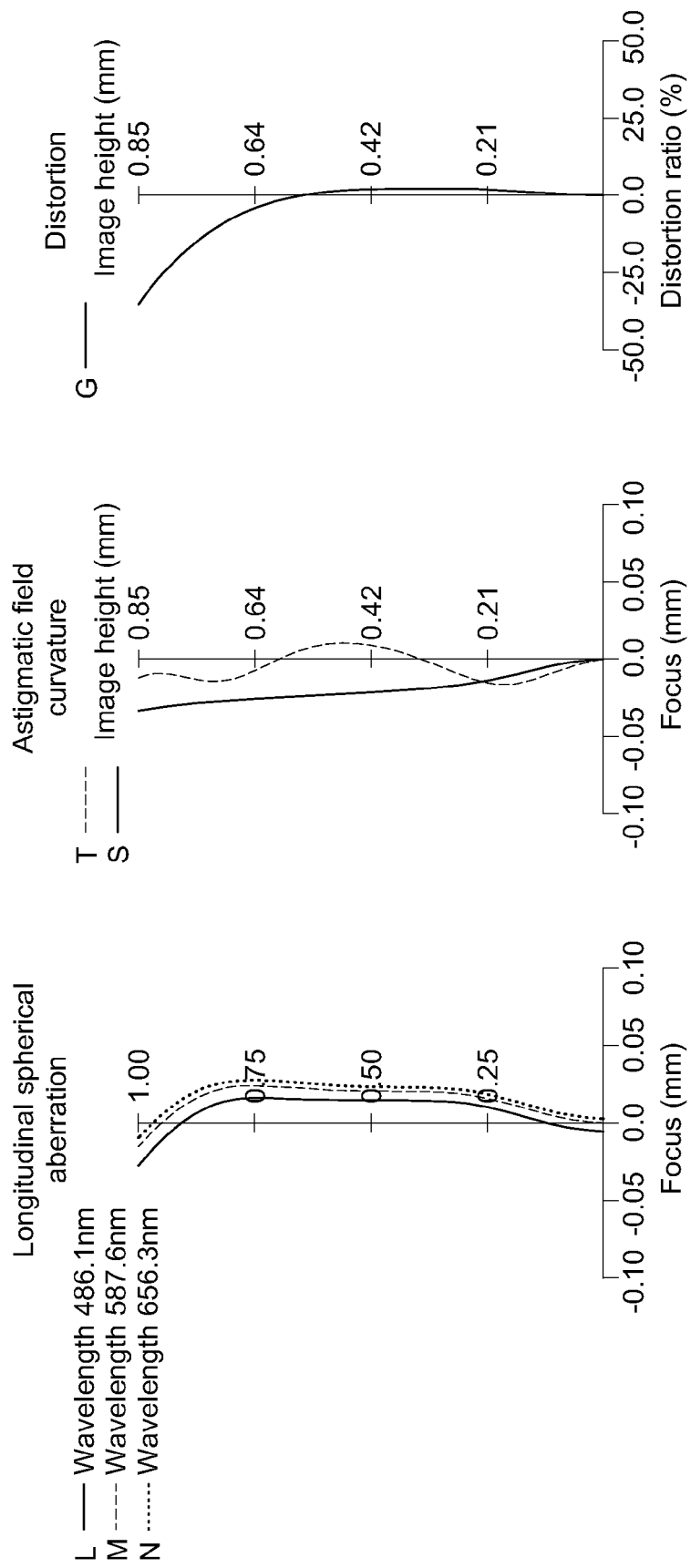

OPTICAL LENS SYSTEM FOR IMAGE TAKING

CROSS-REFERENCE TO RELATED APPLICATIONS

This non-provisional application claims priority under 35 U.S.C. §119(a) on Patent Application No(s). 100141270 filed in Taiwan, R.O.C. on Nov. 11, 2011, the entire contents of which are hereby incorporated by reference.

BACKGROUND

1. Technical Field

The present disclosure relates to an optical lens system for image taking, and more particularly to a miniaturized optical lens system for image taking.

2. Related Art

In recent years, the use of photographic lens assembly is widespread, especially in mobile phone, webcam, car, surveillance camera and electronic entertainment industry. The photo-sensing device, e.g. a sensor, of an ordinary photographing camera is commonly selected from a charge coupled device (CCD) and a complementary metal-oxide semiconductor (CMOS) device. In addition, with the advance of semiconductor manufacturing technology enabling the miniaturization of pixel size of sensors, the resolution of a compact optical lens assembly is gradually increased so there are increasing demands for compact optical lens assemblies capable of generating better quality images.

To obtain a wide field of view, there is a so-called inverse telephoto structure adopted in a conventional photographic lens assembly having a wide field of view. In order to improve the image quality and miniaturize the overall size, a photographic lens assembly consists of three lens elements is disclosed. For example, U.S. Pat. No. 7,397,612 discloses an optical system for taking image consists of three lens elements including, from the object side to the image side, a first lens element with negative refractive power, a second lens element with positive refractive power, and a third lens element with positive refractive power. However, this assembly generates the excessive curvature radius of an object-side surface of the first lens element and the excessive curvature radius of an image-side of the first lens element, so the excessive high order spherical aberration is obtained and the difficulty of lens manufacturing is increased.

To sum up, a photographic lens assembly having a wide field of view without the excessive high order spherical aberration is urgently needed.

SUMMARY

According to an embodiment, an optical lens system for image taking comprises, in order from an object side to an image side, a first lens element with negative refractive power, a second lens element with positive refractive power, a third lens element with negative refractive power. The first lens element comprises a concave object-side surface and a concave image-side surface. The second lens element comprises a convex image-side surface. The third lens element comprises an object-side surface, a concave image-side surface near an optical axis and a convex image-side surface away from the optical axis. Both the object-side surface and the image-side surface are aspheric. The third lens element is made of plastic.

The optical lens system for image taking satisfies the following conditions:

$0<T_{23}/T_{12}<0.7$; and  (Condition 1)

$0<(R_5+R_6)/(R_5-R_6)<4.0$;  (Condition 2)

Wherein $T_{12}$ is the axial distance between the first lens element and the second lens element, $T_{23}$ is the axial distance between the second lens element and the third lens element, $R_5$ is the curvature radius of the object-side surface of the third lens element, and $R_6$ is the curvature radius of the image-side surface of the third element.

According to another embodiment, an optical lens system for image taking comprises, in order from an object side to an image side: a first lens element with negative refractive power, a second lens element with positive refractive power, and a third lens element with negative refractive power. The first lens element comprises a concave object-side surface of the first lens element near an optical axis and a convex object-side surface of the first lens element away from the optical axis. The second lens element comprises a convex object-side surface and a convex image-side surface. The third lens element comprises an object-side surface, a concave image-side surface near the optical axis and a convex image-side surface away from the optical axis. Both the object-side surface and the image-side surface are aspheric. The third lens element is made of plastic.

The optical lens system for image taking satisfies the following conditions:

$0<T_{23}/T_{12}<0.7$; and  (Condition 1)

$0<(R_5+R_6)/(R_5-R_6)<4.0$;  (Condition 2)

Wherein $T_{12}$ is the axial distance between the first lens element and the second lens element, $T_{23}$ is the axial distance between the second lens element and the third lens element, $R_5$ is the curvature radius of the object-side surface of the third lens element, and $R_6$ is the curvature radius of the image-side surface of the third element.

According to yet another embodiment, an optical lens system for image taking comprises, in order from an object side to an image side: a first lens element with negative refractive power, a second lens element with positive refractive power and a third lens element with negative refractive power. The first lens element comprises a concave object-side surface of the first lens element near an optical axis and a convex object-side surface of the first lens element away from the optical axis. The second lens element comprises a convex image-side surface. The third lens element comprises a concave object-side surface, a concave image-side surface near the optical axis and a convex image-side surface away from the optical axis. Both the object-side surface and the image-side surface are aspheric. The third lens element is made of plastic.

The optical lens system for image taking satisfying the following condition:

$0<T_{23}/T_{12}<0.7$;  (Condition 1)

$0<(R_5+R_6)/(R_5-R_6)<1.0$; and $0.8(\text{millimeter,mm})<TD<3.0\text{ mm}$;  (Condition 3)

Wherein $T_{12}$ is the axial distance between the first lens element and the second lens element, $T_{23}$ is the axial distance between the second lens element and the third lens element, TD is the axial distance between the object-side surface of the first lens element and the image-side surface of the third lens element, $R_5$ is the curvature radius of the object-side surface of the third lens element, and $R_6$ is the curvature radius of the image-side surface of the third element.

BRIEF DESCRIPTION OF THE DRAWINGS

The present disclosure will become more fully understood from the following detailed description when taken in connection with the accompanying drawings, which show, for purpose of illustrations only, and thus do not limit other possible embodiments derived from the spirit of the present disclosure, and wherein:

FIG. 1B is a graph of longitudinal spherical aberration curves in the optical lens system for image taking in FIG. 1A;

FIG. 1C is a graph of astigmatic field curves in the optical lens system for image taking in FIG. 1A;

FIG. 1D is a graph of a distortion curve in the optical lens system for image taking in FIG. 1A;

FIG. 3B is a graph of longitudinal spherical aberration curves in the optical lens system for image taking in FIG. 3A;

FIG. 3C is a graph of astigmatic field curves in the optical lens system for image taking in FIG. 3A;

FIG. 3D is a graph of a distortion curve in the optical lens system for image taking in FIG. 3A;

FIG. 5B is a graph of longitudinal spherical aberration curves in the optical lens system for image taking in FIG. 5A;

FIG. 5C is a graph of astigmatic field curves in the optical lens system for image taking in FIG. 5A;

FIG. 5D is a graph of a distortion curve in the optical lens system for image taking in FIG. 5A;

FIG. 6B is a graph of longitudinal spherical aberration curves in the optical lens system for image taking in FIG. 6A;

FIG. 6C is a graph of astigmatic field curves in the optical lens system for image taking in FIG. 6A;

FIG. 6D is a graph of a distortion curve in the optical lens system for image taking in FIG. 6A;

FIG. 7B is a graph of longitudinal spherical aberration curves in the optical lens system for image taking in FIG. 7A;

FIG. 7C is a graph of astigmatic field curves in the optical lens system for image taking in FIG. 7A;

FIG. 7D is a graph of a distortion curve in the optical lens system for image taking in FIG. 7A;

FIG. 8B is a graph of longitudinal spherical aberration curves in the optical lens system for image taking in FIG. 8A;

FIG. 8C is a graph of astigmatic field curves in the optical lens system for image taking in FIG. 8A; and FIG. 8D is a graph of a distortion curve in the optical lens system for image taking in FIG. 8A.

DETAILED DESCRIPTION

Figure 1A:
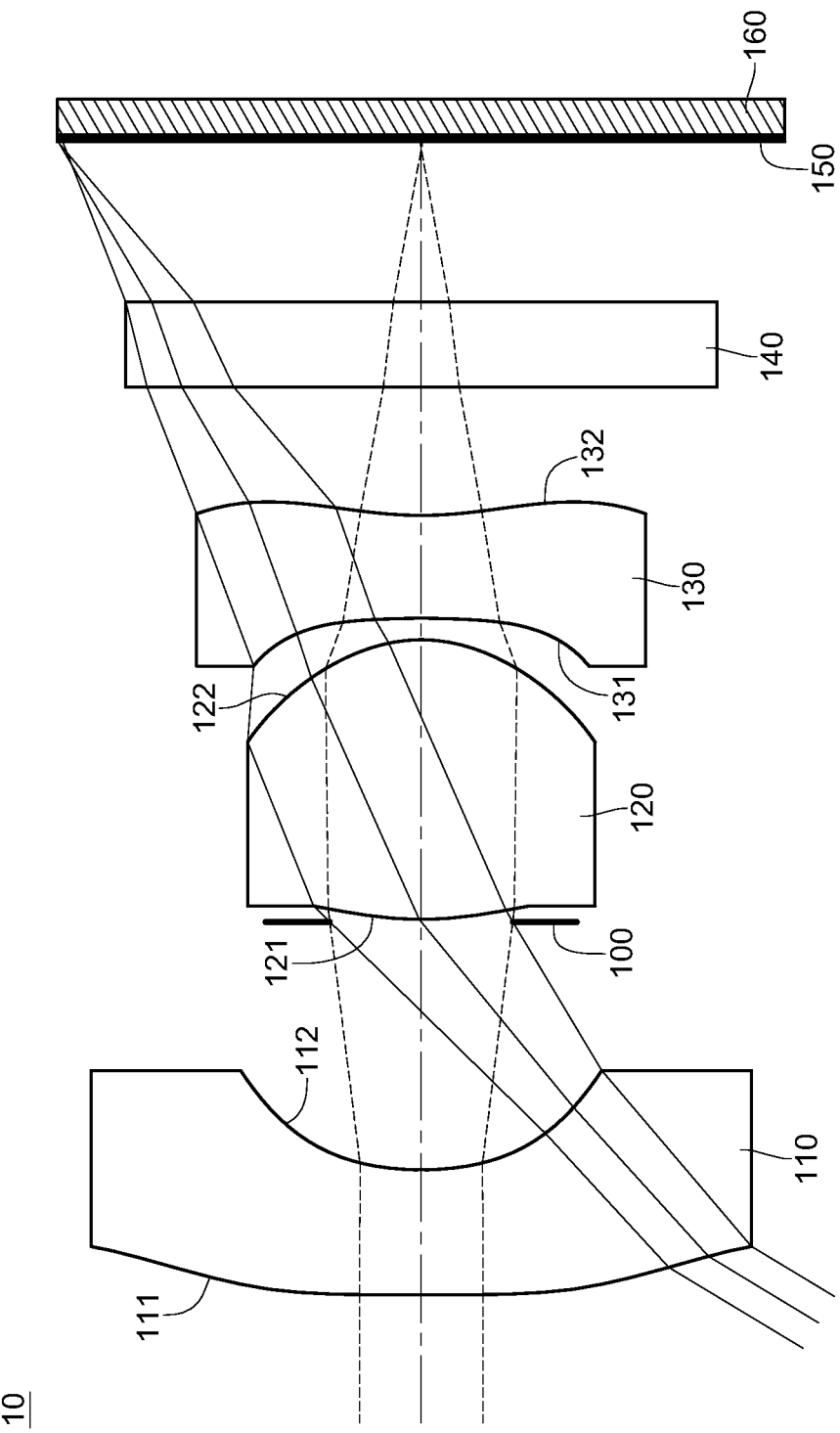
FIG. 1A is a schematic structural view of a first embodiment of an optical lens system for image taking.

The optical lens system for image taking of the present disclosure is described with FIG. 1A as an example to illustrate that the embodiments have similar lens combinations, configuration relationships, and the same conditions of the optical lens system. The differences are described in detail in the following embodiments other than the embodiment described in FIG. 1.

Taking FIG. 1A as an example, the optical lens system for image taking 10 comprises, from an object side to an image side along an optical axis (from left to right in FIG. 1A) in sequence, a first lens element 110, a second lens element 120, a third lens element 130, an infrared filter 140 and an image sensor 160 disposed on an image plane 150.

The first lens element 110 comprises an object-side surface 111 and an image-side surface 112. The refractive power of the first lens element 110 is negative for expanding the field of view of the optical lens system for image taking 10. The object-side surface 111 and the image-side surface 112 are concave for sharing the refractive power of the first lens element 110 evenly, and, therefore, the excessive curvature radius of the object-side surface 111 and the image-side surface 112 are avoided to decrease the difficulty of the first lens element 110 manufacturing. The object-side surface 111 near the optical axis is concave and the object-side surface 111 away from the optical axis is convex for reducing the angle of incidence on the image sensor 160, and, therefore, correcting the aberrations.

The second lens element 120 comprises an object-side surface 121 and an image-side surface 122. The refractive power of the second lens element 120 is positive for correcting the aberration of the first lens element 110. The object-side surface 121 and the image-side surface 122 are convex for distributing the overall refractive power of the second lens element 120 which makes the total optical length of the optical lens system for image taking 10 become shorter.

The third lens element 130 comprises an object-side surface 131 and an image-side surface 132. Accordingly, a telephoto structure is formed by the third lens element 130 with negative refractive power and the second lens element 120 so the total optical length of the optical lens system for image taking 10 is shortened. The object-side surface 131 and the image-side surface 132 are concave for correcting the high order aberration. The image-side surface 132 near the optical axis is concave and the image-side surface 132 away from the optical axis is convex for reducing the angle of incidence on the image sensor 160, and, therefore, correcting the aberrations.

The optical lens system for image taking 10 satisfies the following conditions:

$$0 < T_{23}/T_{12} < 0.7 \quad \text{(Condition 1)}$$

$$0 < (R_5 + R_6)/(R_5 - R_6) < 4.0 \quad \text{(Condition 2)}$$

$$0.8 (\text{millimeter, mm}) < TD < 3.0 \text{ mm} \quad \text{(Condition 3)}$$

wherein $T_{12}$ is the axial distance between the first lens element 110 and the second lens element 120; $T_{23}$ is the axial distance between the second lens element 120 and the third lens element 130; TD is the axial distance between the object-side surface 111 and the image-side surface 132; $R_5$ is the curvature radius of the object-side 131; $R_6$ is the curvature radius of the image-side surface 132.

Satisfying Condition 1 is favorable for effectively controlling the total optical length of the optical lens system for image taking 10. In some embodiments, the first lens element 110 and the second lens element 120 satisfy $0 < T_{23}/T_{12} < 0.35$. Satisfying Condition 2 is favorable for correcting the excessive high order spherical aberration. In some embodiments, the curvature radius of the object-side 131 and the curvature radius of the image-side surface 132 satisfy $0 < (R_5 + R_6)/(R_5 - R_6) < 1.0$. Satisfying Condition 3 is favorable for the miniaturization of the optical lens system for image taking 10, so that the optical lens system for image taking 10 can be assembled in the lightweight and thin body electronic devices.

Furthermore, the optical lens system for image taking 10 comprises a stop, which can be an aperture stop 100, disposed between the first lens element 110 and the second lens element 120. In addition, the optical lens system for image taking 10 satisfies at least one of the following conditions:

$$0 < (R_3+R_4)/(R_3-R_4) < 2.0 \quad \text{(Condition 4)}$$

$$28 < V_2-V_3 < 45 \quad \text{(Condition 5)}$$

$$0.8 < f/f_{23} < 1.3 \quad \text{(Condition 6)}$$

$$75° \text{ (degree)} < FOV < 140° \quad \text{(Condition 7)}$$

$$2.5 < TTL/CT_2 < 5.5 \quad \text{(Condition 8)}$$

$$1.70 < TD/f < 3.0 \quad \text{(Condition 9)}$$

$$-1.0 < (R_1+R_2)/(R_1-R_2) < 1.0 \quad \text{(Condition 10)}$$

Wherein $R_1$ is the curvature radius of the object-side surface 111; $R_2$ is the curvature radius of the image-side surface 112; $R_3$ is the curvature radius of the object-side surface 121; $R_4$ is the curvature radius of the image-side surface 122; $V_2$ is the Abbe number of the second lens element 120; $V_3$ is the Abbe number of the third lens element 130; f is the focal length of the optical lens system for image taking 10; $f_{23}$ is the combined focal length of the second lens element 120 and the third lens element 130 (that is, an effective focal length of a synthetic lens assembly of the second lens element 120 and the third lens element 130); FOV is the maximal field of view of the optical lens system for image taking 10; TTL is the axial distance between the object-side surface 111 and the image plane 150; $CT_2$ is the central thickness of the second lens element 120.

Satisfying Condition 4 is favorable for shortening the total optical length of the optical lens system for image taking 10. In some embodiments, the curvature radius of the object-side surface 121 and the curvature radius of the image-side surface 122 satisfy $0<(R_3+R_4)/(R_3-R_4)<1.0$. When Condition 5 is satisfied, the second lens element 120 and the third lens element 130 are favorable for correcting the chromatism of the optical lens system for image taking 10. Satisfying Condition 6 is favorable for achieving a balance between shortening the total optical length and correcting the aberration of the optical lens system for image taking 10. When Condition 7 is satisfied, the optical lens system for image taking 10 is favorable for providing a wider field of view.

When Condition 8 is satisfied, the thickness of the second lens element 120 is favorable to shorten the total optical length of the optical lens system for image taking 10 for the miniaturization of the optical lens system for image taking 10. When Condition 9 is satisfied, a smaller volume of the optical lens system for image taking 10 is achieved. Satisfying Condition 10 is favorable for providing a sufficient angle of view and correcting the high order aberration of the optical lens system for image taking 10.

Otherwise, in some embodiments, in the first lens element 110, only the object-side surface 111 is concave for correcting the high order aberration (e.g. the fourth embodiment). In the second lens element 120, only the image-side surface 122 is convex for generating enough positive refractive power to correct the aberration of the optical lens system for image taking 10 (e.g. the third embodiment). In the third lens element 130, only the image-side surface 132 is concave for making a principal point of the optical lens system for image taking 10 farther away from the image plane 150, and, therefore, shortening the total optical length of the optical lens system for image taking 10 (e.g. the second embodiment, the third embodiment, the fourth embodiment and the eighth embodiment).

Furthermore, in the optical lens system for image taking 10 of the present disclosure, all the lenses may be made of glass or plastic. If a lens element is made of glass, there is more freedom in distributing the overall refractive power of the optical lens system for image taking 10. If a lens element is made of plastic, the production cost is effectively reduced. In addition, the surfaces of the lens elements can be aspheric and easily made into aspherical profiles, allowing more design parameter freedom which can be used to reduce aberrations and shorten the total track length of the optical lens system for image taking 10 effectively.

In addition, in the optical lens system for image taking 10, a convex surface means the surface at a paraxial site is convex; a concave surface means the surface at a paraxial site is concave, unless further specified differently.

Furthermore, for eliminating the stray light to improve the image quality or limiting the object image to a desirable size, at least one stop, such as a glare stop or field stop, may be disposed in front of the first lens element 110, between each of the lens elements or in front of the image plane 150 in the optical lens system for image taking 10, but not limited to the above-mentioned locations.

As for the optical lens system for image taking 10, the specific schemes are further described with the following embodiments. Parameters in the embodiments are defined as follows. Fno is an f-number value of the optical lens system for image taking 10, and HFOV is half of maximal field of view in the optical lens system for image taking 10. The aspheric surface in the embodiments may be represented by, but not limited to, the following aspheric surface equation (Condition ASP):

$$X(Y) = (Y^2/R)/(1 + \text{sqrt}(1 - (1+k)*(Y/R)^2)) + \sum_i (Ai)*(Y^i)$$

Wherein Y is the distance from the point on the curve of the aspheric surface to the optical axis, X is the distance of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment

Embodiment 1

FIG. 1A is a schematic structural view of the first embodiment of the optical lens system for image taking. In this embodiment, light having the reference wavelength of 587.6 nm is incident on the optical lens system for image taking 10. However, the reference wavelength of the light does not intend to limit the disclosure. In some embodiments, light with different wavelength is used based on various demands.

In this embodiment, the refractive power of the first lens element 110 is negative; the refractive power of the second lens element 120 is positive; the refractive power of the third lens element 130 is negative. The image-side surface 112 is concave, the object-side surface 111 near the optical axis is concave and the object-side surface 111 away from the optical axis is convex. The object-side surface 121 and the image-side surface 122 are convex. The object-side surface 131 is concave, the image-side surface 132 near the optical axis is concave, and the image-side surface 132 away from the optical axis is convex.

The detailed data of the optical lens system for image taking 10 is as shown in Table 1-1 below:

TABLE 1-1

Embodiment 1
f = 0.81 mm, Fno = 2.80, HFOV = 59.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −19.944183 (ASP) | 0.293 | Plastic | 1.514 | 56.8 | −1.30 |
| 2 | | 0.692780 (ASP) | 0.581 | | | | |
| 3 | Ape. Stop | Plano | 0.006 | | | | |
| 4 | Lens 2 | 0.854134 (ASP) | 0.655 | Plastic | 1.544 | 55.9 | 0.57 |
| 5 | | −0.356819 (ASP) | 0.050 | | | | |
| 6 | Lens 3 | −2.522965 (ASP) | 0.241 | Plastic | 1.640 | 23.3 | −0.99 |
| 7 | | 0.882321 (ASP) | 0.300 | | | | |
| 8 | IR-cut filter | Plano | 0.200 | Glass | 1.517 | 64.2 | — |
| 9 | | Plano | 0.375 | | | | |
| 10 | Image Plane | Plano | — | | | | |

Note:
Reference wavelength is d-line 587.6 nm, and ASP represents aspheric.

In Table 1-1, the first lens element 110, the second lens element 120 and the third lens element 130 are made of plastic. From the object-side surface 111 to the image-side surface 132, all the surfaces are aspheric, and the aspheric surfaces can satisfy Condition ASP, but are not limited thereto. As for the parameters of the aspheric surfaces, reference is made to Table 1-2 below:

TABLE 1-2

| Surface# | 1 | 2 | 4 |
|---|---|---|---|
| K | −1.00000E+00 | −9.25581E−01 | −4.52339E+01 |
| $A_4$ | 1.35508E+00 | 2.91498E+00 | 6.46404E+00 |
| $A_6$ | −2.86236E+00 | 1.46817E+01 | −1.19651E+02 |
| $A_8$ | 2.50780E+00 | −1.32905E+02 | 1.09178E+03 |
| $A_{10}$ | −8.56647E−01 | 3.36684E+02 | −4.76085E+03 |
| $A_{12}$ | 4.15395E−03 | — | — |

| Surface# | 5 | 6 | 7 |
|---|---|---|---|
| K | −8.42169E−01 | −3.43133E−01 | −7.61622E−01 |
| $A_4$ | 2.33769E+00 | −1.46792E+00 | −3.23715E+00 |
| $A_6$ | −2.43319E+01 | −2.02612E+01 | 6.85960E+00 |
| $A_8$ | 1.34579E+02 | 9.77869E+01 | −1.25594E+01 |
| $A_{10}$ | −3.98538E+02 | −3.01488E+02 | 1.02487E+01 |
| $A_{12}$ | — | −4.88777E+01 | 6.34447E+00 |

In Table 1-1, the curvature radius, the thickness and the focal length are shown in millimeters (mm). Surface numbers 0-10 represent the surfaces sequentially arranged from the object-side to the image-side along the optical axis. "f" stands for the focal length, "Fno" is the f-number, and "HFOV" is half of maximal field of view of this embodiment. In Table 1-2, k represents the conic coefficient of the equation of the aspheric surface profiles. A1-A12 represent the aspheric coefficients ranging from the 1st order to the $12^{th}$ order. All labels for Tables of the remaining embodiments share the same definitions as those in Table 1-1 and Table 1-2 of the first embodiment, and their definitions will not be stated again.

The content of Table 1-3 may be deduced from Table 1-1:

TABLE 1-3

| Embodiment 1 | |
|---|---|
| f (mm) | 0.81 |
| Fno | 2.80 |

TABLE 1-3-continued

| Embodiment 1 | |
|---|---|
| $V_2 − V_3$ | 32.6 |
| $T_{23}/T_{12}$ | 0.09 |
| $(R_1 + R_2)/(R_1 − R_2)$ | 0.93 |
| $(R_3 + R_4)/(R_3 − R_4)$ | 0.41 |
| $(R_5 + R_6)/(R_5 − R_6)$ | 0.48 |
| $f/f_{23}$ | 1.04 |
| $TTL/CT_2$ | 4.02 |
| TD (mm) | 1.83 |
| TD/f | 2.25 |
| FOV (deg.) | 118.0 |

It can be observed from Table 1-3 that $T_{23}/T_{12}$ equals 0.09 which satisfies Condition 1; $(R_5+R_6)/(R_5-R_6)$ equals 0.48 which satisfies Condition 2; TD equals 1.83 mm which satisfies Condition 3; $(R_3+R_4)/(R_3-R_4)$ equals 0.41 which satisfies Condition 4.

$V_2-V_3$ equals 32.6 which satisfies Condition 5; $f/f_{23}$ equals 1.04 which satisfies Condition 6; FOV equals 118.0° which satisfies Condition 7; $TTL/CT_2$ equals 4.02 which satisfies Condition 8; TD/f equals 2.25 which satisfies Condition 9; $(R_1+R_2)/(R_1-R_2)$ equals 0.93 which satisfies Condition 10.

FIG. 1B is a graph of longitudinal spherical aberration curves when the lights having wavelengths of 486.1 nm (L), 587.6 nm (M), and 656.3 nm (N) are respectively projected in the optical lens system for image taking 10 in FIG. 1A. Horizontal axis is the focus position (millimeter, mm), and vertical axis is the normalized entrance pupil or aperture value. From FIG. 1B, the corresponding longitudinal spherical aberration generated by the optical lens system for image taking 10 are shown within the range of −0.050 mm to 0.025 mm.

In the second embodiment to the eighth embodiment and the graphs of the longitudinal spherical aberration curves in FIGS. 2B, 3B, 4B, 5B, 6B, 7B and 8B, their labeling scheme shares many similarities hence it will not be repeated herein for conciseness.

FIG. 1C is a graph of astigmatic field curves from a tangential plane (T) and a sagittal plane (S). Horizontal axis is the focus position (mm), and vertical axis is the image height (mm). From FIG. 1C that the astigmatic field curvature of the tangential plane is within a range of −0.025 mm to 0.025 mm, and the astigmatic field curvature of the sagittal plane is within a range of −0.050 mm to 0.0 mm.

In the second embodiment to the eighth embodiment and the graphs of the astigmatic field curves in FIGS. 2C, 3C, 4C, 5C, 6C, 7C and 8C, their labeling scheme shares many similarities hence it will not be repeated herein for conciseness.

FIG. 1D is a graph of a distortion curve in the optical lens system for image taking 10 in FIG. 1A. The horizontal axis is the distortion ratio (%), and the vertical axis is the image height (mm). It can be observed from FIG. 1D that the distortion ratio corresponding to the light having wavelength of 587.6 nm is within a range of −50.0% to 0%. As shown in FIGS. 1B to 1D, the optical lens system for image taking 10, designed according to the first embodiment, is capable of effectively correcting various aberrations.

In the second embodiment to the eighth embodiment and the graph of the distortion curves in FIGS. 2D, 3D, 4D, 5D, 6D, 7D and 8D, the solid line G indicates the distortion curve of the light having the wavelength of 587.6 nm, which will not be repeated herein for conciseness.

It should be noted that the distortion curves and the astigmatic field curves of the wavelength of 486.1 nm and 656.3 nm are highly similar to the distortion curve and the astigmatic field curves of the wavelength of 587.6 nm. In order to prevent the confusion of reading the curves in FIGS. 1C and 1D, the distortion curve and the astigmatic field curves of wavelengths of 486.1 nm and 656.3 nm are not shown in FIGS. 1C and 1D, and the same applies throughout the rest of the embodiments of this present disclosure.

The Second Embodiment

Embodiment 2

Figure 2A:
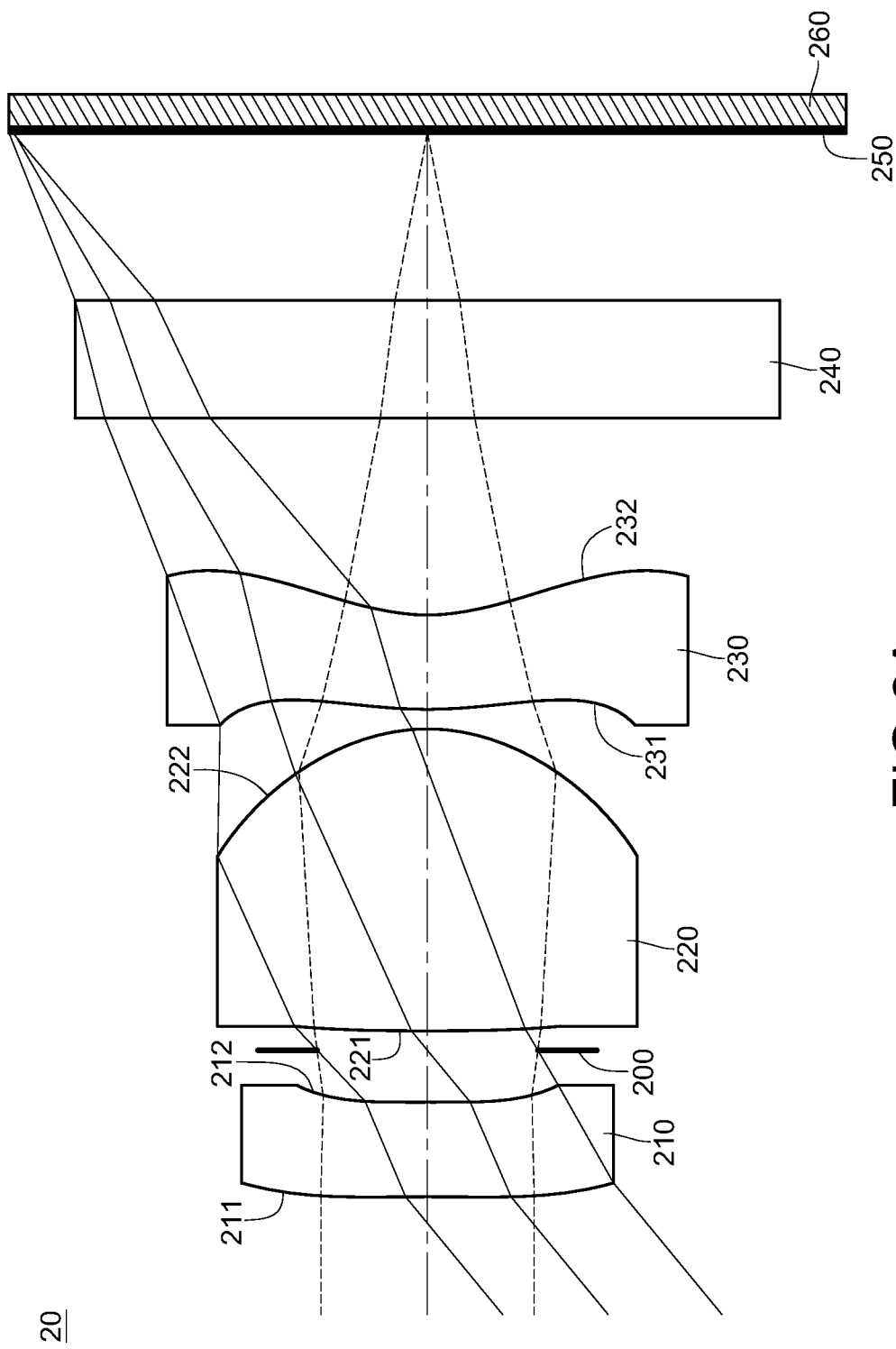
FIG. 2A is a schematic structural view of a second embodiment of an optical lens system for image taking.

FIG. 2A is a schematic structural view of the second embodiment of the optical lens system for image taking. The specific implementation and elements of the second embodiment are substantially the same as those in the first embodiment. The element symbols in the second embodiment all begin with "2" which correspond to those in the first embodiment with the same function or structure. For conciseness, only the differences are illustrated below, and the similarities will not be repeated herein.

In this embodiment, for example, the reference wavelength of the light received by the optical lens system for image taking 20 is 587.6 nm.

In this embodiment, the refractive power of a first lens element 210 is negative; the refractive power of a second lens element 220 is positive; the refractive power of a third lens element 230 is negative. The first lens element 210 has an object-side surface 211 and a concave image-side surface 212. The object-side surface 211 near an optical axis is concave and the object-side surface 211 away from the optical axis convex. The second lens element 220 has a convex object-side surface 221 and a convex image-side surface 222. The third lens element 230 has a convex object-side surface 231 and an image-side surface 232. The image-side surface 232 near the optical axis is concave and the image-side surface 232 away from the optical axis is convex.

The detailed data of the optical lens system for image taking 20 is as shown in Table 2-1 below:

TABLE 2-1

Embodiment 2
f = 1.41 mm, Fno = 2.60, HFOV = 39.5 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −8.901300 (ASP) | 0.240 | Plastic | 1.640 | 23.3 | −9.41 |
| 2 | | 18.825300 (ASP) | 0.132 | | | | |
| 3 | Ape. Stop | Plano | 0.050 | | | | |
| 4 | Lens 2 | 50.000000 (ASP) | 0.767 | Plastic | 1.544 | 55.9 | 0.91 |
| 5 | | −0.496590 (ASP) | 0.050 | | | | |
| 6 | Lens 3 | 1.181350 (ASP) | 0.240 | Plastic | 1.634 | 23.8 | −1.82 |
| 7 | | 0.537110 (ASP) | 0.500 | | | | |
| 8 | IR-cut filter | Plano | 0.300 | Glass | 1.517 | 64.2 | — |
| 9 | | Plano | 0.424 | | | | |

TABLE 2-1-continued

Embodiment 2
f = 1.41 mm, Fno = 2.60, HFOV = 39.5 deg.

| Surface # | | Curvature radius (mm) | Thickness (mm) | Material | Index | Abbe # | Focal length (mm) |
|---|---|---|---|---|---|---|---|
| 10 | Image Plane | Plano | — | | | | |

Note:
Reference wavelength is d-line 587.6 nm, and ASP represents aspheric.

In Table 2-1, the first lens element 210, the second lens element 220 and the third lens element 230 are made of plastic. From the object-side surface 211 to the image-side surface 232, all the surfaces are aspheric, and the aspheric surfaces can satisfy Condition ASP, but are not limited thereto. As for the parameters of the aspheric surfaces, reference is made to Table 2-2 below.

TABLE 2-2

| Surface# | 1 | 2 | 4 |
|---|---|---|---|
| K | 0.00000E+00 | 0.00000E+00 | −1.00000E+00 |
| $A_4$ | 1.25306E+00 | 3.25457E+00 | 1.24472E+00 |
| $A_6$ | −1.21239E+00 | −5.08862E+00 | 1.39356E−01 |
| $A_8$ | 2.25266E+00 | 1.03263E+02 | −5.10381E+01 |
| $A_{10}$ | −1.10175E+01 | −4.29061E+02 | 1.36217E+02 |
| $A_{12}$ | −2.61077E+01 | −2.08710E+00 | −2.03115E+00 |
| $A_{14}$ | 8.66176E+01 | — | — |

| Surface# | 5 | 6 | 7 |
|---|---|---|---|
| K | −8.53862E−01 | −1.71915E+01 | −1.08846E+00 |
| $A_4$ | 1.55132E−01 | −1.02866E+00 | −3.31979E+00 |
| $A_6$ | −2.36185E−01 | −6.20494E−01 | 1.07762E+01 |
| $A_8$ | −7.15161E+00 | −4.58334E−01 | −3.16773E+01 |
| $A_{10}$ | 1.44659E+00 | 4.37274E+00 | 5.69854E+01 |
| $A_{12}$ | −1.66525E+01 | −7.18595E+01 | −5.18324E+01 |
| $A_{14}$ | −1.62052E+01 | −1.02680E+01 | 1.12257E+01 |
| $A_{16}$ | — | 1.62863E+02 | 9.15757E+00 |

In Table 2-2, k represents the conic coefficient of the equation of the aspheric surface profiles. A1-A16 represent the aspheric coefficients ranging from the 1st order to the 16$^{th}$ order. All labels for Tables of the remaining embodiments share the same definitions as those in Table 2-2 of the second embodiment.

The content of Table 2-3 may be deduced from Table 2-1.

TABLE 2-3

| Embodiment 2 | |
|---|---|
| f (mm) | 1.41 |
| Fno | 2.60 |
| $V_2 - V_3$ | 32.1 |
| $T_{23}/T_{12}$ | 0.27 |
| $(R_1 + R_2)/(R_1 - R_2)$ | −0.36 |
| $(R_3 + R_4)/(R_3 - R_4)$ | 0.98 |
| $(R_5 + R_6)/(R_5 - R_6)$ | 2.67 |
| $f/f_{23}$ | 1.09 |
| $TTL/CT_2$ | 3.39 |
| TD (mm) | 1.48 |
| TD/f | 1.05 |
| FOV (deg.) | 79.0 |

Figures 2B, 2C, 2D:
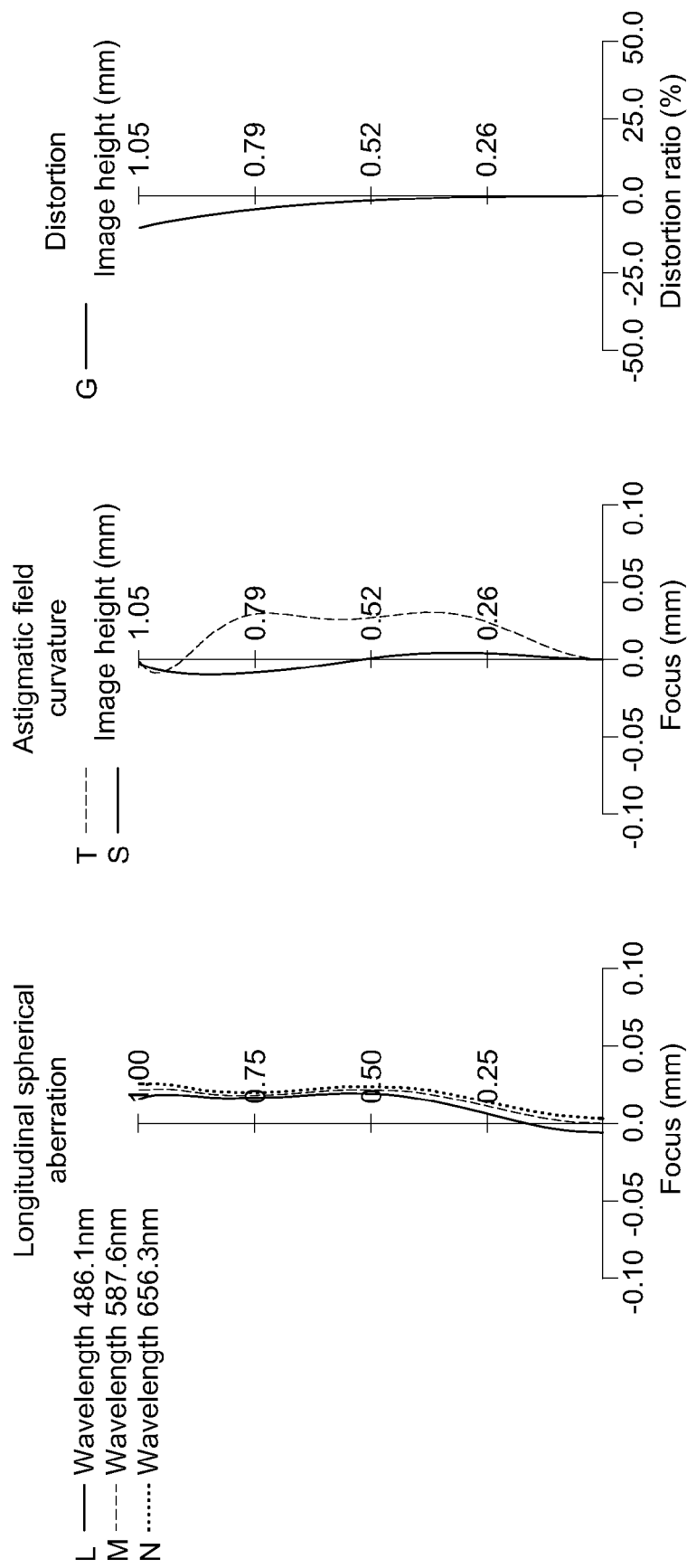
FIG. 2B is a graph of longitudinal spherical aberration curves in the optical lens system for image taking in FIG. 2A.
FIG. 2C is a graph of astigmatic field curves in the optical lens system for image taking in FIG. 2A.
FIG. 2D is a graph of a distortion curve in the optical lens system for image taking in FIG. 2A.

FIG. 2B is a graph of longitudinal spherical aberration curves when the lights having wavelengths of 486.1 nm (L), 587.6 nm (M), and 656.3 nm (N) are projected in the optical lens system for image taking 20 in FIG. 2A. From FIG. 2B, the corresponding longitudinal spherical aberrations generated by the optical lens system for image taking 20 are within a range of −0.05 mm to 0.06 mm.

FIG. 2C is a graph of astigmatic field curves from a tangential plane (T) and a sagittal plane (S). From FIG. 2C, the astigmatic field curvature of the tangential plane is within a range of −0.025 mm to 0.050 mm, and the astigmatic field curvature of the sagittal plane is within a range of −0.025 mm to 0.025 mm.

FIG. 2D is a graph of a distortion curve in the optical lens system for image taking 20 in FIG. 2A. It can be observed from FIG. 2D that the distortion ratio is within a range of −15.0% to 0.0%. As shown in FIGS. 2B to 2D, the optical lens system for image taking 20, designed according to the second embodiment, is capable of effectively correcting various aberrations.

The Third Embodiment

Embodiment 3

Figure 3A:
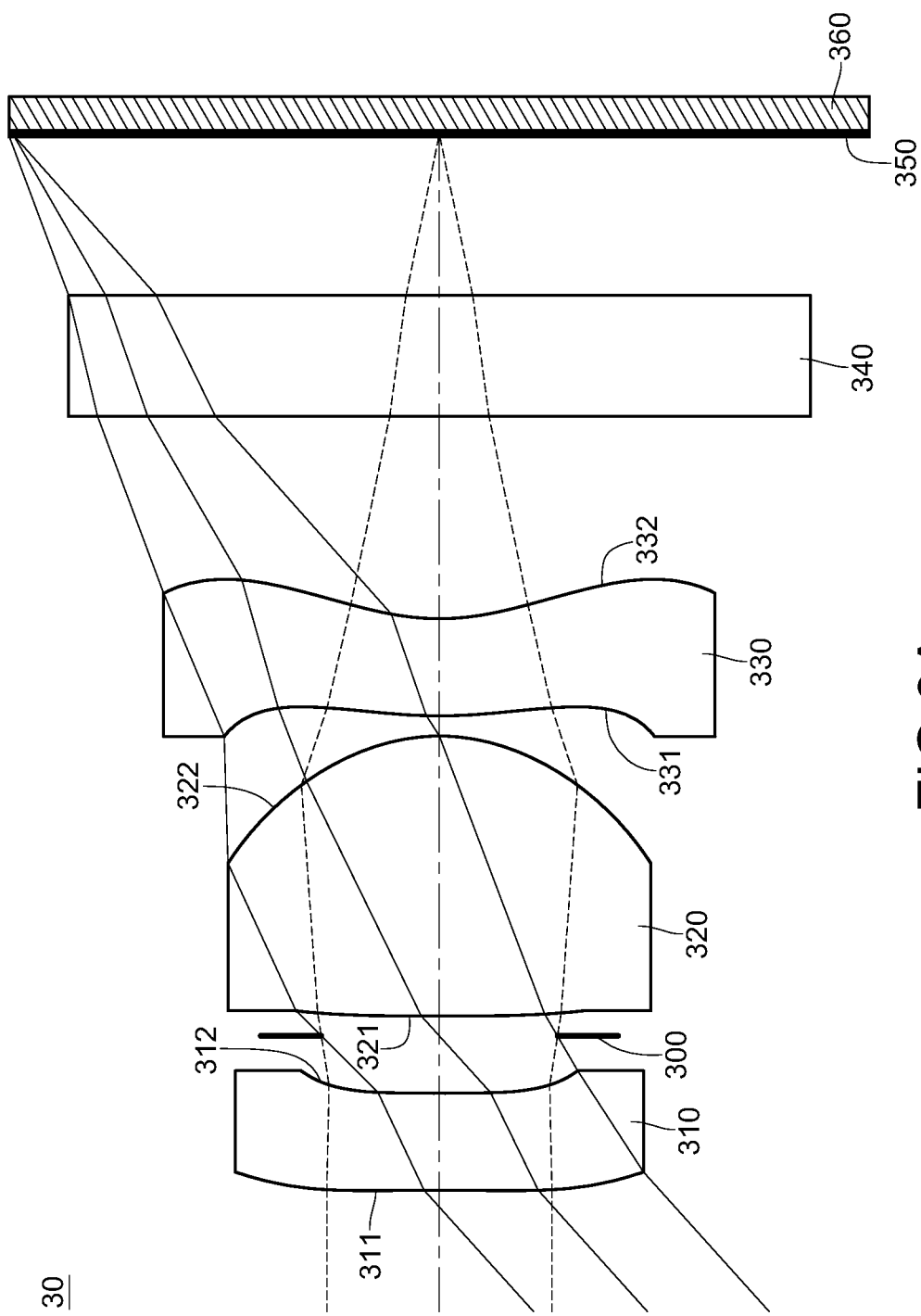
FIG. 3A is a schematic structural view of a third embodiment of an optical lens system for image taking.

FIG. 3A is a schematic structural view of the third embodiment of the optical lens system for image taking. The specific implementation and elements of the third embodiment are substantially the same as those in the first embodiment. The element symbols in the third embodiment all begin with "3" which correspond to those in the first embodiment with the same function or structure. For conciseness, only the differences are illustrated below, and the similarities will not be repeated herein.

In this embodiment, for example, the reference wavelength of the light received by the optical lens system for image taking 30 is 587.6 nm.

In this embodiment, the refractive power of a first lens element 310 is negative; the refractive power of a second lens element 320 is positive; the refractive power of a third lens element 330 is negative. The first lens element 310 has an object-side surface 311 and a concave image-side surface 312. The object-side surface 311 near an optical axis is concave and the object-side surface 311 away from the optical axis is convex. The second lens element 320 has a concave object-side surface 321 and a convex image-side surface 322. The third lens element 330 has a convex object-side surface 331 and an image-side surface 332. The image-side surface 332 near the optical axis is concave and the image-side surface 332 away from the optical axis is convex.

The detailed data of the optical lens system for image taking 30 is as shown in Table 3-1 below.

TABLE 3-1

Embodiment 3
f = 1.33 mm, Fno = 2.40, HFOV = 42.0 deg.

| Surface # | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −6.493500 (ASP) | 0.240 | Plastic | 1.583 | 30.2 | −10.30 |
| 2 | | 81.300800 (ASP) | 0.141 | | | | |
| 3 | Ape. Stop | Plano | 0.050 | | | | |
| 4 | Lens 2 | −43.352000 (ASP) | 0.692 | Plastic | 1.530 | 55.8 | 0.93 |
| 5 | | −0.490580 (ASP) | 0.050 | | | | |
| 6 | Lens 3 | 1.208760 (ASP) | 0.240 | Plastic | 1.607 | 26.6 | −2.17 |
| 7 | | 0.583160 (ASP) | 0.500 | | | | |
| 8 | IR-cut filter | Plano | 0.300 | Glass | 1.517 | 64.2 | — |
| 9 | | Plano | 0.391 | | | | |
| 10 | Image Plane | Plano | — | | | | |

Note:
Reference wavelength is d-line 587.6 nm, and ASP represents aspheric.

In Table 3-1, the first lens element 310, the second lens element 320 and the third lens element 330 are made of plastic. From the object-side surface 311 to the image-side surface 332, all surfaces can be aspheric, and the aspheric surfaces can satisfy Condition ASP, but are not limited thereto. As for the parameters of the aspheric surfaces, reference is made to Table 3-2 below.

TABLE 3-2

| Surface# | 1 | 2 | 4 |
|---|---|---|---|
| K | 0.00000E+00 | −1.00000E+00 | −1.00000E+00 |
| $A_4$ | 1.22575E+00 | 3.33711E+00 | 1.25278E+00 |
| $A_6$ | −3.51642E−01 | −6.41164E−01 | −6.24923E−01 |
| $A_8$ | −3.96555E+00 | 5.09961E+01 | −2.29488E+01 |
| $A_{10}$ | 2.34719E+01 | 4.58943E+01 | 4.29831E+01 |
| $A_{12}$ | −8.58867E+01 | −2.08712E+00 | −2.03117E+00 |
| $A_{14}$ | 8.66176E+01 | — | — |

| Surface# | 5 | 6 | 7 |
|---|---|---|---|
| K | −7.83817E−01 | −2.81389E+01 | −1.06371E+00 |
| $A_4$ | 6.24420E−02 | −6.84838E−01 | −3.15407E+00 |
| $A_6$ | 1.06416E+00 | −2.39810E+00 | 1.02325E+01 |
| $A_8$ | −1.26835E+01 | 5.29625E+00 | −3.09869E+01 |
| $A_{10}$ | 2.50566E+01 | −1.45595E+00 | 5.71396E+01 |
| $A_{12}$ | −2.08332E+01 | −8.81483E+01 | −5.56400E+01 |
| $A_{14}$ | −2.31759E+01 | −1.02680E+01 | 1.62487E+01 |
| $A_{16}$ | — | 1.62863E+02 | 8.31871E+00 |

The content of Table 3-3 may be deduced from Table 3-1.

TABLE 3-3

| Embodiment 3 | |
|---|---|
| f (mm) | 1.33 |
| Fno | 2.40 |
| $V_2 - V_3$ | 29.2 |
| $T_{23}/T_{12}$ | 0.26 |
| $(R_1 + R_2)/(R_1 - R_2)$ | −0.85 |
| $(R_3 + R_4)/(R_3 - R_4)$ | 1.02 |
| $(R_5 + R_6)/(R_5 - R_6)$ | 2.86 |
| $f/f_{23}$ | 1.07 |
| $TTL/CT_2$ | 3.62 |
| TD (mm) | 1.41 |
| TD/f | 1.06 |
| FOV (deg.) | 84.0 |

FIG. 3B is a graph of longitudinal spherical aberration curves when the lights having wavelengths of 486.1 nm (L), 587.6 nm (M), and 656.3 nm (N) are projected in the optical lens system for image taking 30 in FIG. 3A. From FIG. 3B the corresponding longitudinal spherical aberrations generated by the optical lens system for image taking 30 are shown within a range of −0.025 mm to 0.050 mm.

FIG. 3C is a graph of astigmatic field curves from a tangential plane (T) and a sagittal plane (S). From FIG. 3C that the astigmatic field curvature of the tangential plane is within a range of −0.025 mm to 0.075 mm, and the astigmatic field curvature of the sagittal plane is within a range of −0.025 mm to 0.025 mm.

FIG. 3D is a graph of a distortion curve in the optical lens system for image taking 30 in FIG. 3A. It can be observed from FIG. 3D that the distortion ratio is within a range of −15.0% to 0.0%. As shown in FIGS. 3B to 3D, the optical lens system for image taking 30, designed according to the third embodiment, is capable of effectively correcting various aberrations.

The Fourth Embodiment

Embodiment 4

Figure 4A:
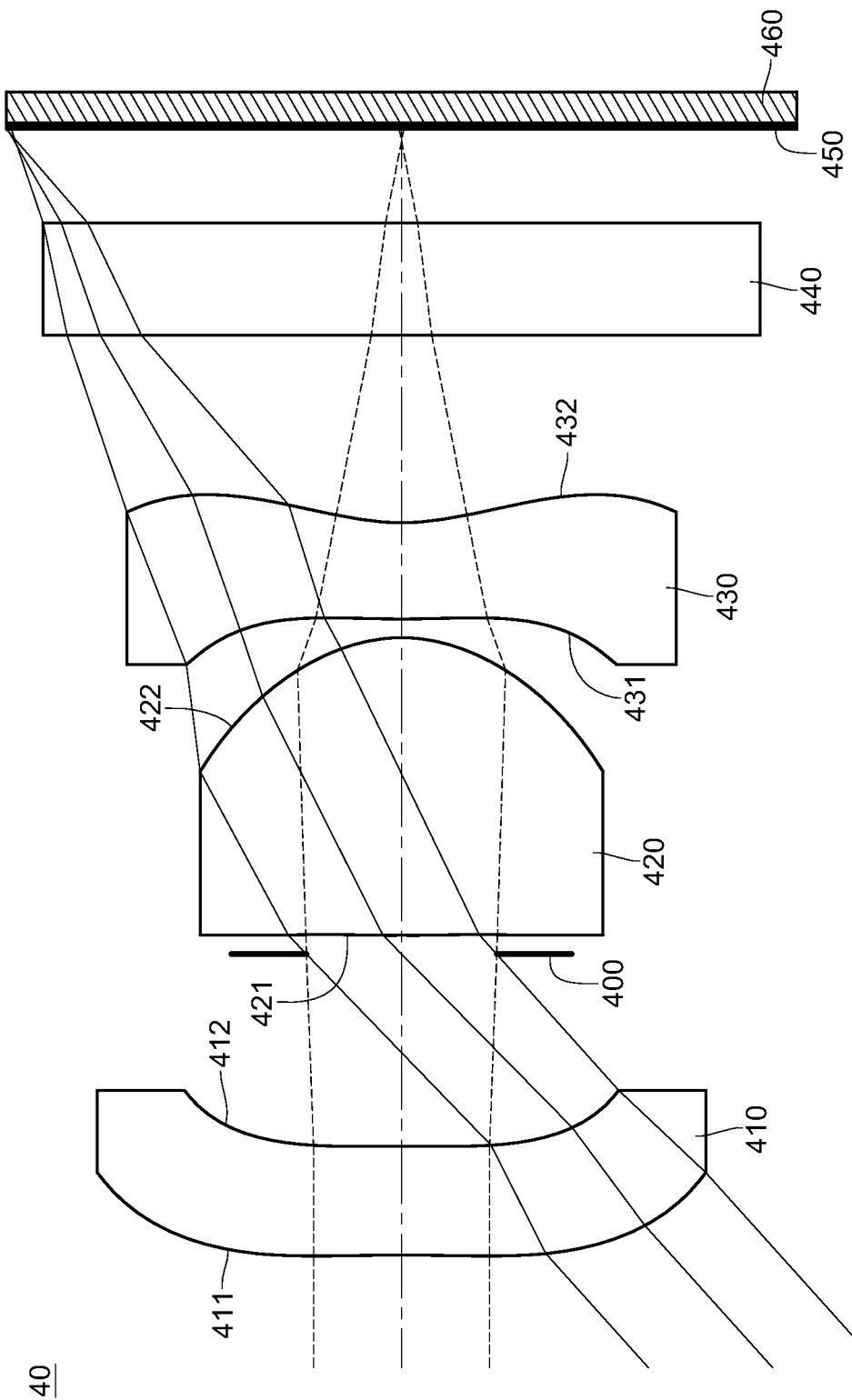
FIG. 4A is a schematic structural view of a fourth embodiment of an optical lens system for image taking.

FIG. 4A is a schematic structural view of the fourth embodiment of the optical lens system for image taking. The specific implementation and elements of the fourth embodiment are substantially the same as those in the first embodiment. The element symbols in the fourth embodiment all begin with "4" which correspond to those in the first embodiment with the same function or structure. For conciseness, only the differences are illustrated below, and the similarities will not be repeated herein.

In this embodiment, for example, the reference wavelength of the light received by the optical lens system for image taking 40 is 587.6 nm.

In this embodiment, the refractive power of a first lens element 410 is negative; the refractive power of a second lens element 420 is positive; the refractive power of a third lens element 430 is negative. The first lens element 410 has an object-side surface 411 and a convex image-side surface 412. The object-side surface 411 near an optical axis is concave and the object-side surface 411 away from the optical axis is convex. The second lens element 420 has a convex object-side surface 421 and a convex image-side surface 422. The third lens element 430 has a convex object-side surface 431 and an image-side surface 432. The image-side surface 432 near the optical axis is concave and the image-side surface 432 away from the optical axis is convex.

The detailed data of the optical lens system for image taking 40 is as shown in Table 4-1 below.

TABLE 4-1

Embodiment 4
f = 1.22 mm, Fno = 2.60, HFOV = 41.9 deg.

| Surface# | | Curvature radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −5.526700 (ASP) | 0.290 | Plastic | 1.640 | 23.3 | −12.04 |
| 2 | | −19.979100 (ASP) | 0.513 | | | | |
| 3 | Ape. Stop | Plano | 0.050 | | | | |
| 4 | Lens 2 | 5.922900 (ASP) | 0.794 | Plastic | 1.544 | 55.9 | 0.78 |
| 5 | | −0.437550 (ASP) | 0.050 | | | | |
| 6 | Lens 3 | 3.151300 (ASP) | 0.257 | Plastic | 1.634 | 23.8 | −1.39 |
| 7 | | 0.668150 (ASP) | 0.500 | | | | |
| 8 | IR-cut filter | Plano | 0.300 | Glass | 1.517 | 64.2 | — |
| 9 | | Plano | 0.250 | | | | |
| 10 | Image Plane | Plano | — | | | | |

Note:
Reference wavelength is d-line 587.6 nm, and ASP represents aspheric.

In Table 4-1, the first lens element 410, the second lens element 420 and the third lens element 430 are made of plastic. From the object-side surface 411 to the image-side surface 432, all surfaces can be aspheric, and the aspheric surfaces can satisfy Condition ASP, but are not limited thereto. As for the parameters of the aspheric surfaces, reference is made to Table 4-2 below.

TABLE 4-2

| Surface# | 1 | 2 | 4 |
|---|---|---|---|
| K | 0.00000E+00 | 0.00000E+00 | −5.83718E+00 |
| $A_4$ | 9.26749E−01 | 1.40328E+00 | −7.76348E−01 |
| $A_6$ | −9.34024E−01 | −1.87115E−01 | 4.43581E+00 |
| $A_8$ | 4.91842E−01 | −5.04593E+00 | −1.29220E+02 |
| $A_{10}$ | 8.74070E−01 | 1.47873E+01 | 7.03639E+02 |
| $A_{12}$ | −1.04198E+00 | 6.94582E+00 | −2.03115E+00 |
| $A_{14}$ | 5.74275E−01 | — | — |

| Surface# | 5 | 6 | 7 |
|---|---|---|---|
| K | −9.30437E−01 | −2.44110E+02 | −1.94223E+00 |
| $A_4$ | 3.16707E−01 | −1.62880E+00 | −2.93034E+00 |
| $A_6$ | −1.05859E+00 | 2.88215E+00 | 1.10111E+01 |
| $A_8$ | −6.12188E+00 | −1.44315E+01 | −3.20090E+01 |
| $A_{10}$ | 1.61533E+01 | 4.14054E+01 | 5.54145E+01 |
| $A_{12}$ | −1.66525E+01 | −7.18595E+01 | −4.57952E+01 |
| $A_{14}$ | −1.89927E+00 | 8.17840E+00 | 1.61049E+00 |
| $A_{16}$ | — | 1.62863E+02 | 1.52527E+01 |

The content of Table 4-3 may be deduced from Table 4-1.

TABLE 4-3

| Embodiment 4 | |
|---|---|
| f (mm) | 1.22 |
| Fno | 2.60 |
| $V_2 - V_3$ | 32.1 |
| $T_{23}/T_{12}$ | 0.09 |
| $(R_1 + R_2)/(R_1 - R_2)$ | −1.76 |
| $(R_3 + R_4)/(R_3 - R_4)$ | 0.86 |
| $(R_5 + R_6)/(R_5 - R_6)$ | 1.54 |
| $f/f_{23}$ | 1.01 |
| $TTL/CT_2$ | 3.66 |
| TD (mm) | 1.95 |
| TD/f | 1.60 |
| FOV (deg.) | 83.8 |

Figures 4B, 4C, 4D:
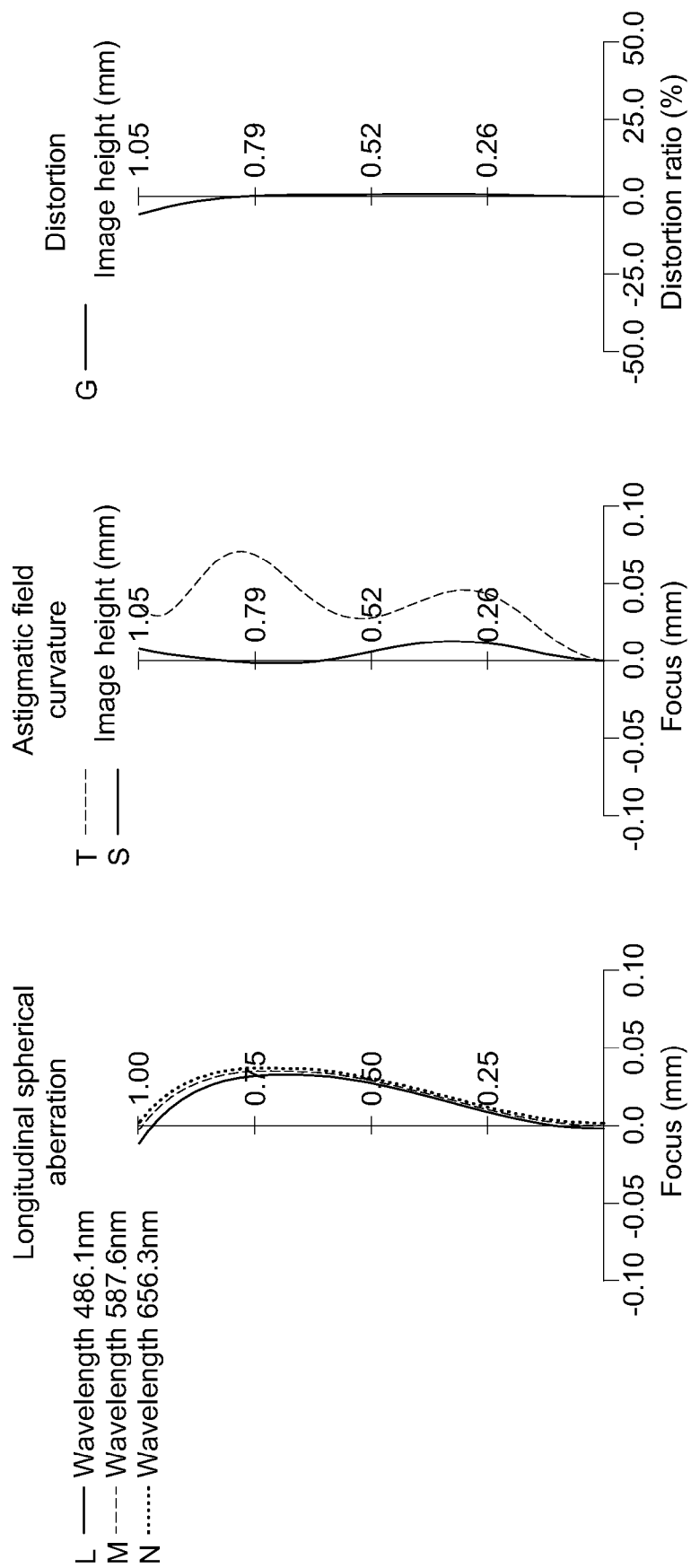
FIG. 4B is a graph of longitudinal spherical aberration curves in the optical lens system for image taking in FIG. 4A.
FIG. 4C is a graph of astigmatic field curves in the optical lens system for image taking in FIG. 4A.
FIG. 4D is a graph of a distortion curve in the optical lens system for image taking in FIG. 4A.

FIG. 4B is a graph of longitudinal spherical aberration curves when the lights having wavelengths of 486.1 nm (L), 587.6 nm (M), and 656.3 nm (N) are projected in the optical lens system for image taking 40 in FIG. 4A. From FIG. 4B, the corresponding longitudinal spherical aberrations generated by the optical lens system for image taking 40 are shown within a range of −0.025 mm to 0.050 mm.

FIG. 4C is a graph of astigmatic field curves from a tangential plane (T) and a sagittal plane (S). From FIG. 4C that the astigmatic field curvature of the tangential plane is within a range of 0.0 mm to 0.075 mm, and the astigmatic field curvature of the sagittal plane is within a range of 0.0 mm to 0.025 mm.

FIG. 4D is a graph of a distortion curve in the optical lens system for image taking 40 in FIG. 4A. It can be observed from FIG. 4D that the distortion ratio is within a range of −10.0% to 0.0%. As shown in FIGS. 4B to 4D, the optical lens system for image taking 40, designed according to the fourth embodiment, is capable of effectively correcting various aberrations.

The Fifth Embodiment

Embodiment 5

Figure 5A:
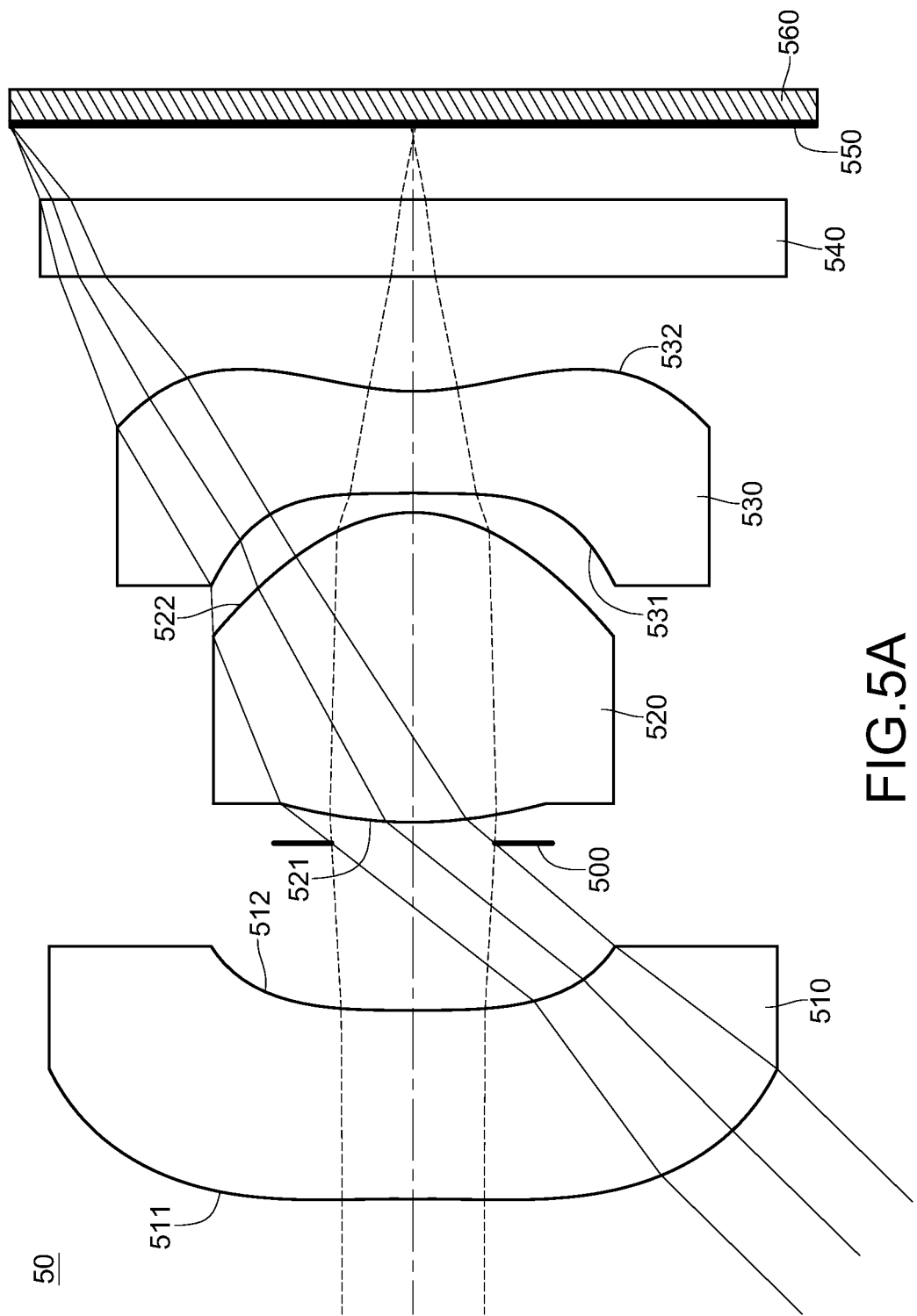
FIG. 5A is a schematic structural view of a fifth embodiment of an optical lens system for image taking.

FIG. 5A is a schematic structural view of the fifth embodiment of the optical lens system for image taking. The specific implementation and elements of the fifth embodiment are substantially the same as those in the first embodiment. The element symbols in the fifth embodiment all begin with "5" which correspond to those in the first embodiment with the same function or structure. For conciseness, only the differences are illustrated below, and the similarities will not be repeated herein.

In this embodiment, for example, the reference wavelength of the light received by the optical lens system for image taking 50 is 587.6 nm.

In this embodiment, the refractive power of a first lens element 510 is negative; the refractive power of a second lens element 520 is positive; the refractive power of a third lens element 530 is negative. The first lens element 510 has an object-side surface 511 and a concave image-side surface 512. The object-side surface 511 near an optical axis is concave and the object-side surface 511 away from the optical axis is convex. The second lens element 520 has a convex object-side surface 521 and a convex image-side surface 522. The third lens element 530 has a concave object-side surface 531 and an image-side surface 532. The image-side surface 532 near the optical axis is concave and the image-side surface 532 away from the optical axis is convex.

The detailed data of the optical lens system for image taking 50 is as shown in Table 5-1 below.

TABLE 5-1

Embodiment 5
f = 0.96 mm, Fno = 2.60, HFOV = 45.5 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −5.526700 (ASP) | 0.492 | Plastic | 1.650 | 21.4 | −4.52 |
| 2 | | 6.494700 (ASP) | 0.436 | | | | |
| 3 | Ape. Stop | Plano | 0.055 | | | | |
| 4 | Lens 2 | 1.150910 (ASP) | 0.809 | Plastic | 1.535 | 56.3 | 0.66 |
| 5 | | −0.387860 (ASP) | 0.050 | | | | |
| 6 | Lens 3 | −30.851000 (ASP) | 0.266 | Plastic | 1.650 | 21.4 | −1.02 |
| 7 | | 0.680510 (ASP) | 0.300 | | | | |
| 8 | IR-cut filter | Plano | 0.200 | Glass | 1.517 | 64.2 | — |
| 9 | | Plano | 0.189 | | | | |
| 10 | Image Plane | Plano | — | | | | |

Note:
Reference wavelength is d-line 587.6 nm, ASP represents aspheric.

In Table 5-1, the first lens element 510, the second lens element 520 and the third lens element 530 are made of plastic. From the object-side surface 511 to image-side surface 532, all the surfaces can be aspheric, and the aspheric surfaces can satisfy Condition ASP, but are not limited thereto. As for the parameters of the aspheric surfaces, reference is made to Table 5-2 below.

TABLE 5-2

| Surface# | 1 | 2 | 4 |
|---|---|---|---|
| K | 0.00000E+00 | 0.00000E+00 | 2.28298E+00 |
| $A_4$ | 8.71569E−01 | 1.84386E+00 | −8.52777E−01 |
| $A_6$ | −1.10666E+00 | −1.38509E+00 | 1.09634E+01 |
| $A_8$ | 8.49603E−01 | −2.63079E+00 | −1.44811E+02 |
| $A_{10}$ | 6.25970E−01 | 2.27614E+01 | 8.99244E+02 |
| $A_{12}$ | −1.52167E+00 | 2.74281E+01 | −2.23273E+03 |
| $A_{14}$ | 8.42381E−01 | — | — |

TABLE 5-2-continued

| Surface# | 5 | 6 | 7 |
|---|---|---|---|
| K | −1.17340E+00 | −1.00000E+00 | −2.03021E+00 |
| $A_4$ | 5.69435E−01 | −2.84454E+00 | −3.27004E+00 |
| $A_6$ | −3.57295E+00 | 4.50268E+00 | 1.17121E+01 |
| $A_8$ | 2.61633E+00 | −2.85015E+01 | −3.33613E+01 |
| $A_{10}$ | 2.90353E+01 | 3.25047E+01 | 5.49134E+01 |
| $A_{12}$ | −2.06191E+01 | −7.55341E+01 | −4.41293E+01 |
| $A_{14}$ | −1.46143E+02 | 1.68196E+02 | 4.29278E+00 |
| $A_{16}$ | — | 4.21084E+02 | 1.15323E+01 |

The content of Table 5-3 may be deduced from Table 5-1.

TABLE 5-3

| Embodiment 5 | |
|---|---|
| f (mm) | 0.96 |
| Fno | 2.60 |
| $V_2 - V_3$ | 34.9 |
| $T_{23}/T_{12}$ | 0.10 |
| $(R_1 + R_2)/(R_1 - R_2)$ | −0.08 |
| $(R_3 + R_4)/(R_3 - R_4)$ | 0.50 |
| $(R_5 + R_6)/(R_5 - R_6)$ | 0.96 |
| $f/f_{23}$ | 1.03 |
| $TTL/CT_2$ | 3.38 |
| TD (mm) | 2.11 |
| TD/f | 2.20 |
| FOV (deg.) | 91.0 |

FIG. 5B is a graph of longitudinal spherical aberration curves when the lights having wavelengths of 486.1 nm (L), 587.6 nm (M), and 656.3 nm (N) are projected in the optical lens system for image taking 50 in FIG. 5A. From FIG. 5B, the corresponding longitudinal spherical aberrations generated by the optical lens system for image taking 50 are shown within a range of −0.025 mm to 0.025 mm.

FIG. 5C is a graph of astigmatic field curves from a tangential plane (T) and a sagittal plane (S). From FIG. 5C that the astigmatic field curvature of the tangential plane is within a range of −0.1 mm to 0.0 mm, and the astigmatic field curvature of the sagittal plane is within a range of −0.15 mm to 0.0 mm.

FIG. 5D is a graph of a distortion curve in the optical lens system for image taking 50 in FIG. 5A. It can be observed from FIG. 5D that the distortion ratio is within a range of 0.0% to 15.0%. As shown in FIGS. 5B to 5D, the optical lens system for image taking 50, designed according to the fifth embodiment, is capable of effectively correcting various aberrations.

The Sixth Embodiment

Embodiment 6

Figure 6A:
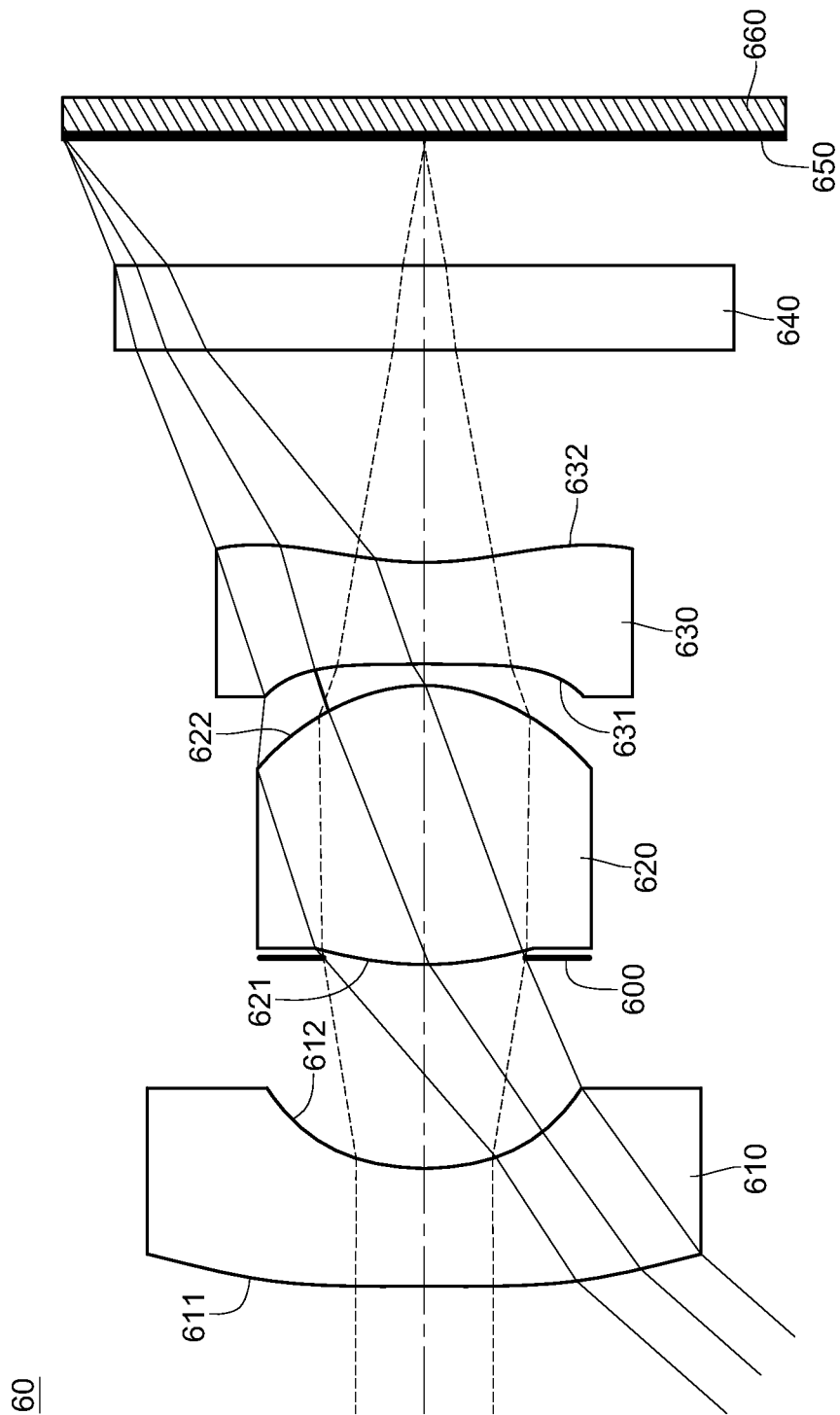
FIG. 6A is a schematic structural view of a sixth embodiment of an optical lens system for image taking.

FIG. 6A is a schematic structural view of the sixth embodiment of the optical lens system for image taking. The specific implementation and elements of the sixth embodiment are substantially the same as those in the first embodiment. The element symbols in the sixth embodiment all begin with "6" which correspond to those in the first embodiment with the same function or structure. For conciseness, only the differences are illustrated below, and the similarities will not be repeated herein.

In this embodiment, for example, the reference wavelength of the light received by the optical lens system for image taking 60 is 587.6 nm.

In this embodiment, the refractive power of a first lens element 610 is negative; the refractive power of a second lens element 620 is positive; the refractive power of a third lens element 630 is negative. The first lens element 610 has an object-side surface 611 and a concave image-side surface 612. The object-side surface 611 near an optical axis is concave and the object-side surface 611 away from the optical axis is convex. The second lens element 620 has a convex object-side surface 621 and a convex image-side surface 622. The third lens element 630 has a concave object-side surface 631 and an image-side surface 632. The image-side surface 632 near the optical axis is concave and the image-side surface 632 is convex.

The detailed data of the optical lens system for image taking 60 is as shown in Table 6-1 below.

TABLE 6-1

Embodiment 6
f = 0.91 mm, Fno = 2.82, HFOV = 48.5 deg.

| Surface# | | Curvature Radius (mm) | | Thickness (mm) | Material | Index | Abbe # | Focal length (mm) |
|---|---|---|---|---|---|---|---|---|
| 0 | Object | Plano | | Infinity | | | | |
| 1 | Lens 1 | −23.618328 | (ASP) | 0.278 | Plastic | 1.514 | 56.8 | −1.17 |
| 2 | | 0.619045 | (ASP) | 0.496 | | | | |
| 3 | Ape. Stop | Plano | | −0.016 | | | | |
| 4 | Lens 2 | 0.805924 | (ASP) | 0.658 | Plastic | 1.544 | 55.9 | 0.61 |
| 5 | | −0.404621 | (ASP) | 0.050 | | | | |
| 6 | Lens 3 | −10.601055 | (ASP) | 0.240 | Plastic | 1.640 | 23.3 | −1.19 |
| 7 | | 0.829271 | (ASP) | 0.500 | | | | |
| 8 | IR-cut filter | Plano | | 0.200 | Glass | 1.517 | 64.2 | — |

TABLE 6-1-continued

Embodiment 6
f = 0.91 mm, Fno = 2.82, HFOV = 48.5 deg.

| Surface# | | Curvature Radius (mm) | Thickness (mm) | Material | Index | Abbe # | Focal length (mm) |
|---|---|---|---|---|---|---|---|
| 9 | | Plano | 0.296 | | | | |
| 10 | Image | Plano | — | | | | |

Note:
Reference wavelength is d-line 587.6 nm, and ASP represents aspheric.

In Table 6-1, the first lens element 610, the second lens element 620 and the third lens element 630 are made of plastic. From the object-side surface 611 to the image-side surface 632, all surfaces can be aspheric, and the aspheric surfaces can satisfy Condition ASP, but are not limited thereto. As for the parameters of the aspheric surfaces, reference is made to Table 6-2 below.

TABLE 6-2

| Surface# | 1 | 2 | 4 |
|---|---|---|---|
| K | −1.00000E+00 | −6.78302E−01 | −3.63547E+01 |
| $A_4$ | 1.23639E+00 | 2.87232E+00 | 6.97424E+00 |
| $A_6$ | −2.79019E+00 | 1.65699E+01 | −1.14304E+02 |
| $A_8$ | 2.80701E+00 | −1.24837E+02 | 1.10923E+03 |
| $A_{10}$ | −8.31577E−01 | 4.62525E+02 | −5.31099E+03 |
| $A_{12}$ | −7.47033E−01 | — | — |

| Surface# | 5 | 6 | 7 |
|---|---|---|---|
| K | −7.81998E−01 | 7.77173E+01 | −3.07420E−01 |
| $A_4$ | 2.10549E+00 | −1.42938E+00 | −2.97834E+00 |
| $A_6$ | −2.44078E+01 | −1.93794E+01 | 6.04822E+00 |
| $A_8$ | 1.36839E+02 | 9.44129E+01 | −1.38822E+01 |
| $A_{10}$ | −3.80096E+02 | −3.53991E+02 | 1.06431E+01 |
| $A_{12}$ | — | −6.28832E+02 | 1.14570E+01 |

The content of Table 6-3 may be deduced from Table 6-1.

TABLE 6-3

Embodiment 6

| | |
|---|---|
| f (mm) | 0.91 |
| Fno | 2.82 |
| $V_2 - V_3$ | 32.6 |
| $T_{23}/T_{12}$ | 0.10 |
| $(R_1 + R_2)/(R_1 - R_2)$ | 0.95 |
| $(R_3 + R_4)/(R_3 - R_4)$ | 0.33 |
| $(R_5 + R_6)/(R_5 - R_6)$ | 0.85 |
| $f/f_{23}$ | 1.18 |
| $TTL/CT_2$ | 4.01 |
| TD (mm) | 1.71 |
| TD/f | 1.87 |
| FOV (deg.) | 97.0 |

FIG. 6B is a graph of longitudinal spherical aberration curves when the lights having wavelengths of 486.1 nm (L), 587.6 nm (M), and 656.3 nm (N) are projected in the optical lens system for image taking 60 in FIG. 3A. From FIG. 6B that for the lights of the wavelengths of 486.1 nm, 587.6 nm, and 656.3 nm, the corresponding longitudinal spherical aberrations generated by the optical lens system for image taking 60 are shown within a range of −0.025 mm to 0.050 mm.

FIG. 6C is a graph of astigmatic field curves from a tangential plane (T) and a sagittal plane (S). From FIG. 6C that the astigmatic field curvature of the tangential plane is within a range of 0.0 mm to 0.050 mm, and the astigmatic field curvature of the sagittal plane is within a range of −0.025 mm to 0.0 mm.

FIG. 6D is a graph of a distortion curve in the optical lens system for image taking 60 in FIG. 6A. It can be observed from FIG. 6D that the distortion ratio is within a range of −25.0% to 0.0%. As shown in FIGS. 6B to 6D, the optical lens system for image taking 60, designed according to the sixth embodiment, is capable of effectively correcting various aberrations.

The Seventh Embodiment

Embodiment 7

Figure 7A:
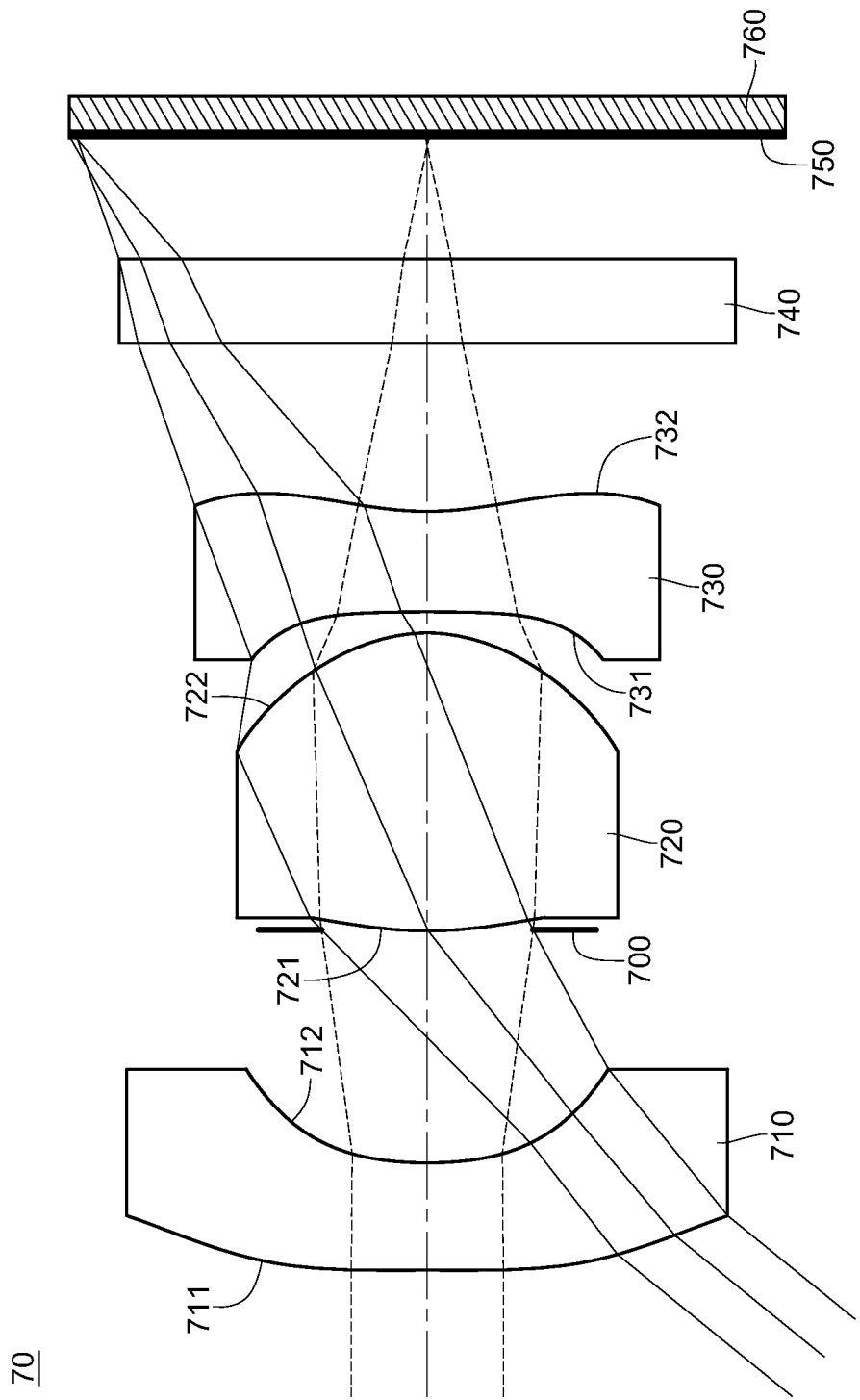
FIG. 7A is a schematic structural view of a seventh embodiment of an optical lens system for image taking.

FIG. 7A is a schematic structural view of the seventh embodiment of the optical lens system for image taking. The specific implementation and elements of the seventh embodiment are substantially the same as those in the first embodiment. The element symbols in the seventh embodiment all begin with "7" which correspond to those in the first embodiment with the same function or structure. For conciseness, only the differences are illustrated below, and the similarities will not be repeated herein.

In this embodiment, for example, the reference wavelength of the light received by the optical lens system for image taking 70 is 587.6 nm.

In this embodiment, the refractive power of a first lens element 710 is negative; the refractive power of a second lens element 720 is positive; the refractive power of a third lens element 730 is negative. The first lens element 710 has an object-side surface 711 and a concave image-side surface 712. The object-side surface 711 near an optical axis is concave and the object-side surface 711 away from the optical axis is convex. The second lens element 720 has a convex object-side surface 721 and a convex image-side surface 722. The third lens element 730 has a concave object-side surface 731 and an image-side surface 732. The image-side surface 732 near the optical axis is concave and the image-side surface 732 away from the optical axis is convex.

The detailed data of the optical lens system for image taking 70 is as shown in Table 7-1 below.

TABLE 7-1

Embodiment 7
f = 0.89 mm, Fno = 2.45, HFOV = 50.9 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | −23.618328 (ASP) | 0.256 | Plastic | 1.514 | 56.8 | −1.59 |
| 2 | | 0.847324 (ASP) | 0.556 | | | | |
| 3 | Ape. Stop | Plano | −0.003 | | | | |
| 4 | Lens 2 | 1.008607 (ASP) | 0.709 | Glass | 1.566 | 61.1 | 0.61 |
| 5 | | −0.388975 (ASP) | 0.050 | | | | |
| 6 | Lens 3 | −5.706234 (ASP) | 0.240 | Plastic | 1.640 | 23.3 | −1.06 |
| 7 | | 0.784887 (ASP) | 0.400 | | | | |
| 8 | IR-cut filter | Plano | 0.200 | Glass | 1.517 | 64.2 | — |
| 9 | | Plano | 0.289 | | | | |
| 10 | Image | Plano | — | | | | |

Note:
Reference wavelength is d-line 587.6 nm, and ASP represents aspheric.

In Table 7-1, the second lens element 720 is made of glass, and the first lens element 710 and the third lens element 730 are made of plastic. From the object-side surface 711 to the image-side surface 732, all surfaces can be aspheric, and the aspheric surfaces can satisfy Condition ASP, but are not limited thereto. As for the parameters of the aspheric surfaces, reference is made to Table 7-2 below.

TABLE 7-2

| Surface# | 1 | 2 | 4 |
|---|---|---|---|
| K | −1.00000E+00 | −1.12327E+00 | −6.23732E+01 |
| $A_4$ | 1.51059E+00 | 2.85015E+00 | 5.84400E+00 |
| $A_6$ | −2.94343E+00 | 1.12772E+01 | −1.12538E+02 |
| $A_8$ | 2.59719E+00 | −8.78110E+01 | 1.21831E+03 |
| $A_{10}$ | −1.09962E+00 | 2.22251E+02 | −6.50842E+03 |
| $A_{12}$ | 4.52549E−03 | — | — |

| Surface# | 5 | 6 | 7 |
|---|---|---|---|
| K | −8.36867E−01 | −2.94983E+02 | −6.25489E−01 |
| $A_4$ | 2.36030E+00 | −1.26038E+00 | −3.15904E+00 |
| $A_6$ | −2.56736E+01 | −2.06275E+01 | 6.41351E+00 |
| $A_8$ | 1.33461E+02 | 1.01029E+02 | −1.29752E+01 |
| $A_{10}$ | −3.18978E+02 | −2.88252E+02 | 1.35893E+01 |
| $A_{12}$ | — | −5.86459E+00 | −2.78031E+00 |

The content of Table 7-3 may be deduced from Table 7-1.

TABLE 7-3

| Embodiment 7 | |
|---|---|
| f (mm) | 0.89 |
| Fno | 2.45 |
| $V_2 - V_3$ | 37.8 |
| $T_{23}/T_{12}$ | 0.09 |
| $(R_1 + R_2)/(R_1 - R_2)$ | 0.93 |
| $(R_3 + R_4)/(R_3 - R_4)$ | 0.44 |
| $(R_5 + R_6)/(R_5 - R_6)$ | 0.76 |

TABLE 7-3-continued

| Embodiment 7 | |
|---|---|
| $f/f_{23}$ | 1.08 |
| $TTL/CT_2$ | 3.71 |
| TD (mm) | 1.81 |

TABLE 7-3-continued

| Embodiment 7 | |
|---|---|
| TD/f | 2.03 |
| FOV (deg.) | 101.8 |

FIG. 7B is a graph of longitudinal spherical aberration curves when the lights having wavelengths of 486.1 nm (L), 587.6 nm (M), and 656.3 nm (N) are projected in the optical lens system for image taking 70 in FIG. 7A. From FIG. 7B, the corresponding longitudinal spherical aberrations generated by the optical lens system for image taking 70 are within a range of −0.050 mm to 0.025 mm.

FIG. 7C is a graph of astigmatic field curves from a tangential plane (T) and a sagittal plane (S). From FIG. 7C that the astigmatic field curvature of the tangential plane is within a range of 0.0 mm to 0.050 mm, and the astigmatic field curvature of the sagittal plane is within a range of −0.025 mm to 0.0 mm.

FIG. 7D is a graph of a distortion curve in the optical lens system for image taking 70 in FIG. 7A. It can be observed from FIG. 7D that the distortion ratio is within a range of −40.0% to 0.0%. As shown in FIGS. 7B to 7D, the optical lens system for image taking 70, designed according to the seventh embodiment, is capable of effectively correcting various aberrations.

The Eighth Embodiment

Embodiment 8

Figure 8A:
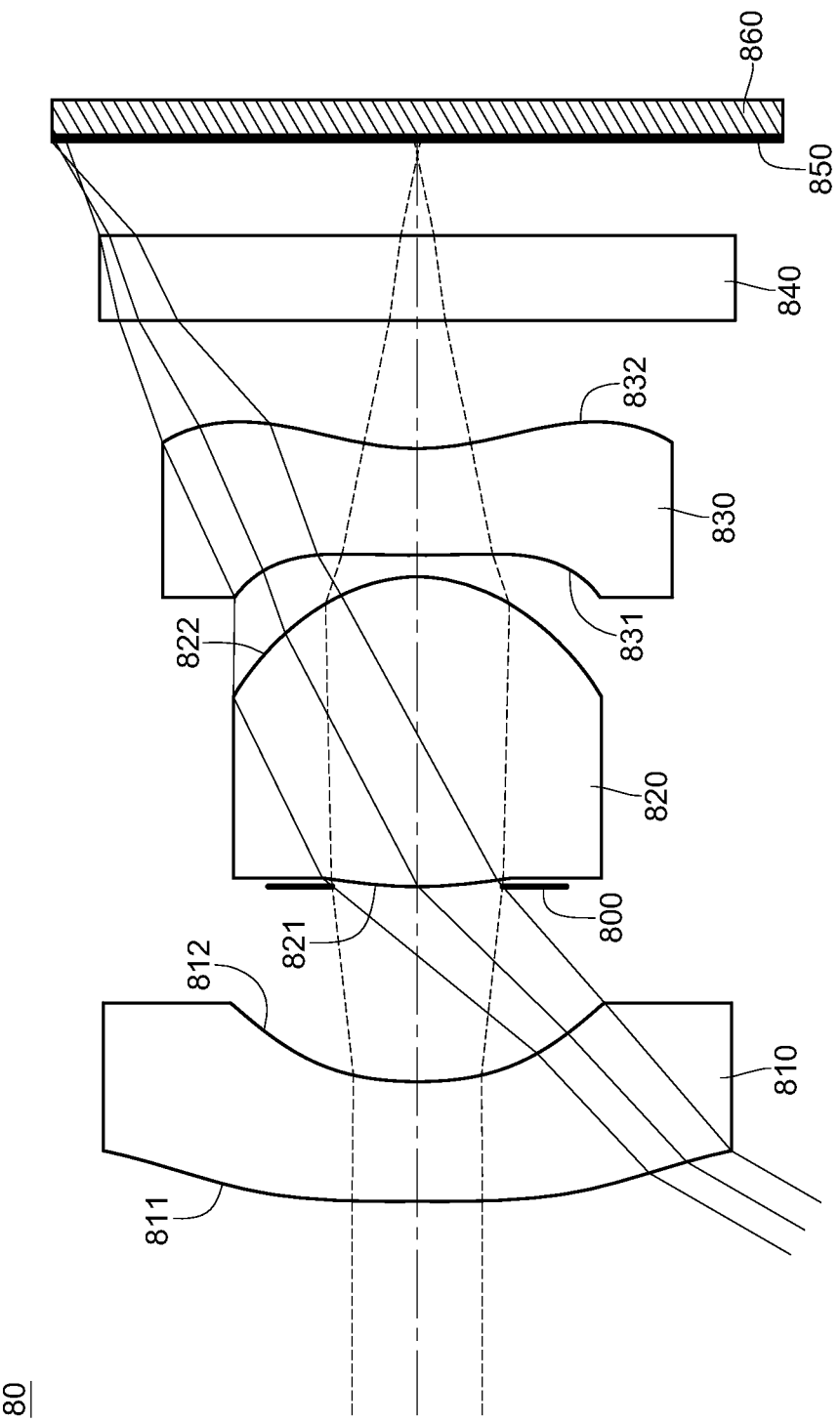
FIG. 8A is a schematic structural view of an eighth embodiment of an optical lens system for image taking.

FIG. 8A is a schematic structural view of the eighth embodiment of the optical lens system for image taking. The specific implementation and elements of the eighth embodiment are substantially the same as those in the first embodiment. The element symbols in the eighth embodiment all begin with "8" which correspond to those in the first embodiment with the same function or structure. For conciseness, only the differences are illustrated below, and the similarities will not be repeated herein.

In this embodiment, for example, the reference wavelength of the light received by the optical lens system for image taking 80 is 587.6 nm.

In this embodiment, the refractive power of a first lens element 810 is negative; the refractive power of a second lens element 820 is positive; the refractive power of a third lens element 830 is negative. The first lens element 810 has a convex object-side surface 811 and a concave image-side surface 812. The second lens element 820 has a convex object-side surface 821 and a convex image-side surface 822. The third lens element 830 has a convex object-side surface 831 and an image-side surface 832. The image-side surface 832 near an optical axis is concave, and the image-side surface 832 away from the optical axis is convex.

The detailed data of the optical lens system for image taking 80 is as shown in Table 8-1 below.

TABLE 8-1

Embodiment 8
f = 0.75 mm, Fno = 2.46, HFOV = 60.0 deg.

| Surface# | | Curvature Radius (mm) | Thickness (mm) | Material | Index | Abbe # | Focal length (mm) |
|---|---|---|---|---|---|---|---|
| 0 | Object | Plano | Infinity | | | | |
| 1 | Lens 1 | 21.425200 (ASP) | 0.281 | | | | |
| 2 | | 0.761740 (ASP) | 0.459 | Plastic | 1.544 | 55.9 | −1.46 |
| 3 | Ape. Stop | Plano | −0.001 | | | | |
| 4 | Lens 2 | 0.964710 (ASP) | 0.727 | Plastic | 1.544 | 55.9 | 0.59 |
| 5 | | −0.355630 (ASP) | 0.051 | | | | |
| 6 | Lens 3 | 3.785700 (ASP) | 0.250 | Plastic | 1.630 | 23.3 | −1.17 |
| 7 | | 0.607960 (ASP) | 0.300 | | | | |
| 8 | IR-cut filter | Plano | 0.200 | Glass | 1.517 | 64.2 | — |
| 9 | | Plano | 0.220 | | | | |
| 10 | Image Plane | Plano | — | | | | |

Note:
Reference wavelength is d-line 587.6 nm; ASP represents aspheric.

In Table 8-1, the first lens element 810, the second lens element 820 and the third lens element 830 are made of plastic. From the object-side surface 811 to the image-side surface 832, all surfaces can be aspheric, and the aspheric surfaces can satisfy Condition ASP, but are not limited thereto. As for the parameters of the aspheric surfaces, reference is made to Table 8-2 below.

TABLE 8-2

| Surface# | 1 | 2 | 4 |
|---|---|---|---|
| K | 1.47185E+01 | −2.97439E+01 | −1.24871E+02 |
| $A_4$ | 1.38813E+00 | 7.83844E+00 | 1.04473E+01 |
| $A_6$ | −3.06287E+00 | −3.73687E+01 | −3.28581E+02 |
| $A_8$ | 2.57172E+00 | 1.08516E+02 | 5.18436E+03 |
| $A_{10}$ | −7.58221E−01 | −1.77737E+02 | −3.46049E+04 |
| $A_{12}$ | −5.67456E−13 | −4.23247E−17 | — |

| Surface# | 5 | 6 | 7 |
|---|---|---|---|
| K | −9.59930E−01 | −1.00000E+00 | −1.00000E+00 |
| $A_4$ | 2.53310E+00 | −1.07462E+00 | −3.19989E+00 |
| $A_6$ | −4.41007E+01 | −2.60724E+01 | 2.49582E+00 |
| $A_8$ | 2.83253E+02 | 3.66493E+01 | 8.23887E+00 |
| $A_{10}$ | −7.16044E+02 | 6.67825E+02 | −2.89075E+01 |
| $A_{12}$ | — | −2.80101E+03 | 2.31235E+01 |

The content of Table 8-3 may be deduced from Table 8-1.

TABLE 8-3

| Embodiment 8 | |
|---|---|
| f (mm) | 0.75 |
| Fno | 2.46 |
| $V_2 - V_3$ | 32.6 |
| $T_{23}/T_{12}$ | 0.11 |
| $(R_1 + R_2)/(R_1 - R_2)$ | 1.07 |
| $(R_3 + R_4)/(R_3 - R_4)$ | 0.46 |
| $(R_5 + R_6)/(R_5 - R_6)$ | 1.38 |
| $f/f_{23}$ | 1.05 |
| $TTL/CT_2$ | 3.33 |
| TD (mm) | 1.77 |
| TD/f | 2.35 |
| FOV (deg.) | 120.0 |

FIG. 8B is a graph of longitudinal spherical aberration curves when the lights having wavelengths of 486.1 nm (L), 587.6 nm (M), and 656.3 nm (N) are projected in the optical lens system for image taking 80 in FIG. 8A. From FIG. 8B, the corresponding longitudinal spherical aberrations generated by the optical lens system for image taking 80 are within a range of −0.050 mm to 0.050 mm.

FIG. 8C is a graph of astigmatic field curves from a tangential plane (T) and a sagittal plane (S). From FIG. 8C that the astigmatic field curvature of the tangential plane is within a range of −0.025 mm to 0.025 mm, and the astigmatic field curvature of the sagittal plane is within a range of −0.050 mm to 0.0 mm.

FIG. 8D is a graph of a distortion curve in the optical lens system for image taking 80 in FIG. 8A. It can be observed from FIG. 8D that the distortion ratio is within a range of −50.0% to 5.0%. As shown in FIGS. 8B to 8D, the optical lens system for image taking 80, designed according to the eighth embodiment, is capable of effectively correcting various aberrations.

What is claimed is:

1. An optical lens system for image taking comprising, in order from an object side to an image side:
   a first lens element with negative refractive power comprising a concave object-side surface and a concave image-side surface;
   a second lens element with positive refractive power comprising a convex image-side surface; and
   a third lens element with negative refractive power comprising an object-side surface, a concave image-side surface near an optical axis and a convex image-side surface away from the optical axis, both the object-side surface and the image-side surface being aspheric, and the third lens element being made of plastic;
   the optical lens system for image taking satisfying the following condition:

$0<T_{23}/T_{12}<0.35$; and $0<(R_5+R_6)/(R_5-R_6)<4.0$;

wherein $T_{12}$ is the axial distance between the first lens element and the second lens element, $T_{23}$ is the axial distance between the second lens element and the third lens element, $R_5$ is the curvature radius of the object-side surface of the third lens element, and $R_6$ is the curvature radius of the image-side surface of the third element.

2. The optical lens system for image taking according to claim 1, wherein the second lens element comprises an object-side surface and the optical lens system for image taking satisfies the following condition:

$0<(R_3+R_4)/(R_3-R_4)<2.0$;

wherein $R_3$ is the curvature radius of the object-side surface of the second lens element, and $R_4$ is the curvature radius of the image-side surface of the second lens element.

3. The optical lens system for image taking according to claim 2, wherein the optical lens system for image taking satisfies the following condition:

$28<V_2-V_3<45$;

wherein $V_2$ is the Abbe number of the second lens element, and $V_3$ is the Abbe number of the third lens element.

4. The optical lens system for image taking according to claim 2, wherein the optical lens system for image taking satisfies the following condition:

$0.8<f/f_{23}<1.3$;

wherein f is the focal length of the optical lens system for image taking, and $f_{23}$ is the combined focal length of the second lens element and the third lens element.

5. The optical lens system for image taking according to claim 2, wherein the optical lens system for image taking satisfies the following condition:

$75°$ (degree)$<FOV<140°$;

wherein FOV is the maximal field of view of the optical lens system for image taking.

6. The optical lens system for image taking according to claim 2, wherein the optical lens system for image taking further comprises an image plane and the optical lens system for image taking satisfies the following condition:

$2.5<TTL/CT_2<5.5$;

wherein TTL is the axial distance between the object-side surface of the first lens element and the image plane, and $CT_2$ is the central thickness of the second lens element.

7. The optical lens system for image taking according to claim 1, wherein the optical lens system for image taking satisfies the following condition:

$0.8$(millimeter,mm)$<TD<3.0$ mm;

wherein TD is the axial distance between the object-side surface of the first lens element and the image-side surface of the third lens element.

8. The optical lens system for image taking according to claim 1, wherein there are a concave object-side surface of the first lens element near the optical axis and a convex object-side surface of the first lens element away from the optical axis.

9. The optical lens system for image taking according to claim 8, wherein the optical lens system for image taking satisfies the following condition:

$1.70<TD/f<3.0$;

wherein TD is the axial distance between the object-side surface of the first lens element and the image-side surface of the third lens element, and f is the focal length of the optical lens system for image taking.

10. An optical lens system for image taking comprising, in order from an object side to an image side:
    a first lens element with negative refractive power comprising a concave object-side surface of the first lens element near an optical axis and a convex object-side surface of the first lens element away from the optical axis;
    a second lens element with positive refractive power comprising a convex object-side surface and a convex image-side surface; and
    a third lens element with negative refractive power comprising an object-side surface, a concave image-side surface near the optical axis and a convex image-side surface away from the optical axis, both the object-side surface and the image-side surface being aspheric, and the third lens element being made of plastic;
    the optical lens system for image taking satisfying the following condition:

$0<T_{23}/T_{12}<0.7$; and $0<(R_5+R_6)/(R_5-R_6)<4.0$;

wherein $T_{12}$ is the axial distance between the first lens element and the second lens element, $T_{23}$ is the axial distance between the second lens element and the third lens element, $R_5$ is the curvature radius of the object-side surface of the third lens element, and $R_6$ is the curvature radius of the image-side surface of the third element.

11. The optical lens system for image taking according to claim 10, wherein the optical lens system for image taking satisfies the following condition:

$0<(R_3+R_4)/(R_3-R_4)<1.0$;

wherein $R_3$ is the curvature radius of the object-side surface of the second lens element, and $R_4$ is the curvature radius of the image-side surface of the second lens element.

12. The optical lens system for image taking according to claim 11, wherein the first lens element comprises an image-side surface and the optical lens system for image taking satisfies the following condition:

$$-1.0<(R_1+R_2)/(R_1-R_2)<1.0;$$

wherein $R_1$ is the curvature radius of the object-side surface of the first lens element, and $R_2$ is the curvature radius of the image-side surface of the first lens element.

13. The optical lens system for image taking according to claim 11, wherein the optical lens system for image taking satisfies the following condition:

$$1.70<TD/f<3.0;$$

wherein TD is the axial distance between the object-side surface of the first lens element and the image-side surface of the third lens element, and f is the focal length of the optical lens system for image taking.

14. The optical lens system for image taking according to claim 11, wherein the optical lens system for image taking satisfies the following condition:

$$75°\text{ (degree)}<FOV<140°;$$

wherein FOV is the maximal field of view of the optical lens system for image taking.

15. The optical lens system for image taking according to claim 14, wherein the optical lens system for image taking satisfies the following condition:

$$0.8\text{(millimeter,mm)}<TD<3.0\text{ mm};$$

wherein TD is the axial distance between the object-side surface of the first lens element and the image-side surface of the third lens element.

16. The optical lens system for image taking according to claim 14, wherein the optical lens system for image taking satisfies the following condition:

$$0<T_{23}/T_{12}<0.35;$$

wherein $T_{12}$ is the axial distance between the first lens element and the second lens element, and $T_{23}$ is the axial distance between the second lens element and the third lens element.

17. An optical lens system for image taking comprising, in order from an object side to an image side:

a first lens element with negative refractive power comprising a concave object-side surface of the first lens element near an optical axis and a convex object-side surface of the first lens element away from the optical axis;

a second lens element with positive refractive power comprising a convex image-side surface; and a third lens element with negative refractive power comprising a concave object-side surface, a concave image-side surface near the optical axis and a convex image-side surface away from the optical axis, both the object-side surface and the image-side surface being aspheric, and the third lens element being made of plastic;

the optical lens system for image taking satisfying the following condition:

$$0<T_{23}/T_{12}<0.7;$$

$$0<(R_5+R_6)/(R_5-R_6)<1.0;\text{ and}$$

$$0.8\text{(millimeter,mm)}<TD<3.0\text{ mm};$$

wherein $T_{12}$ is the axial distance between the first lens element and the second lens element, $T_{23}$ is the axial distance between the second lens element and the third lens element, TD is the axial distance between the object-side surface of the first lens element and the image-side surface of the third lens element, $R_5$ is the curvature radius of the object-side surface of the third lens element, and $R_6$ is the curvature radius of the image-side surface of the third element.

18. The optical lens system for image taking according to claim 17, wherein the first lens element comprises an image-side surface, and the optical lens system for image taking satisfies the following condition:

$$-1.0<(R_1+R_2)/(R_1-R_2)<1.0.$$

wherein $R_1$ is the curvature radius of the object-side surface of the first lens element, and $R_2$ is the curvature radius of the image-side surface of the first lens element.

19. The optical lens system for image taking according to claim 17, wherein the optical lens system for image taking satisfies the following condition:

$$75°\text{ (degree)}<FOV<140°;$$

wherein FOV is the maximal field of view of the optical lens system for image taking.

20. The optical lens system for image taking according to claim 17, wherein the optical lens system for image taking satisfies the following condition:

$$0.8<f/f_{23}<1.3;$$

wherein f is the focal length of the optical lens system for image taking, and $f_{23}$ is the combined focal length of the second lens element and the third lens element.

21. The optical lens system for image taking according to claim 17, wherein the optical lens system for image taking satisfies the following condition:

$$1.70<TD/f<3.0;$$

wherein TD is the axial distance between the object-side surface of the first lens element and the image-side surface of the third lens element, and f is the focal length of the optical lens system for image taking.

* * * * *